(12) United States Patent
    Isgar

(10) Patent No.: US 12,654,100 B2
(45) Date of Patent: Jun. 16, 2026

(54) INTELLIGENT SONG WRITER SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 148 days.

(21) Appl. No.: 18/449,810

(22) Filed: Aug. 15, 2023

(65) Prior Publication Data

US 2024/0050849 A1 Feb. 15, 2024

Related U.S. Application Data

(60) Provisional application No. 63/397,926, filed on Aug. 15, 2022.

(51) Int. Cl.
    *A63F 13/533* (2014.01)
    *A63F 13/46* (2014.01)
    *A63F 13/814* (2014.01)

(52) U.S. Cl.
    CPC ............ *A63F 13/533* (2014.09); *A63F 13/46* (2014.09); *A63F 13/814* (2014.09)

(58) Field of Classification Search
    IPC .................. A63F 13/533,13/46, 13/814, 13/35
    See application file for complete search history.

(56) References Cited

U.S. PATENT DOCUMENTS

2009/0305784 A1* 12/2009 Wong ...................... A63F 13/12
                                                        463/35
2021/0335334 A1* 10/2021 Ackerman ............. G06N 20/00
2021/0335344 A1    10/2021 Park

OTHER PUBLICATIONS

Isgar, Intelligent Song Writer System, Patent Cooperation Treaty Application Serial No. PCT/US24/42078, International Filing Date Aug. 13, 2024, International Search Report and Written Opinion dated Oct. 25, 2024.

* cited by examiner

*Primary Examiner* — Thomas H Henry
(74) *Attorney, Agent, or Firm* — Schmeiser, Olsen & Watts LLP

(57) ABSTRACT

Described is a song writer system. The system includes a server and one or more user computing devices that operate together as a system to create new songs by replacing portions of lyrics of existing songs with user input lyrics that are input using the user computing device. The system includes providing a game that allows for determining a winner based on the lyrics entered by the users. The system also provides a system for creating a new song utilizing replacement lyrics for portions of lyrics of an existing song wherein the new song is created for purposes of a particular event, a particular purpose and the like. The system may utilize artificial intelligence software to assist in recommending words and directing the user through instruction provided on the user computing device on the types of lyrics to enter based on rhythm, syllables, rhyming and the like.

9 Claims, 35 Drawing Sheets

GROUP SONG WRITER GAME PLAYERS

GROUP CONTRIBUTION TO SONG WRITING

INTELLIGENT SONG WRITER SYSTEM

CROSS REFERENCE TO RELATED APPLICATION

This application claims priority to U.S. Provisional Patent Application Ser. No. 63/397,926, filed Aug. 15, 2022, the disclosure of which is hereby incorporated entirely herein by reference.

BACKGROUND OF THE INVENTION

Technical Field

This invention generally relates to a system for creating song lyrics, and more specifically to a song writer system for changing lyrics of current songs as part of a game or as part of system to write songs from existing song lyrics with the assistance from artificial intelligent software, such as machine learning.

State of the Art

Music is a commonly loved form of art. There may be various uses for music from entertainment to celebration. People often try to search for songs that are perfect for a person, for an event or the like. Further, people may look to engage in a game related to music. While people search for music that exists or engage in game play utilizing existing music, there is not a system that assists individuals in the creation of new lyrics to an existing song.

Accordingly, what is needed is a song writer system for creation of new song lyrics.

SUMMARY OF THE INVENTION

An embodiment includes a song writer system comprising: a server having a memory storing user information and song information including lyrics for a plurality of songs; and a plurality of user computing devices coupled to the server, wherein the server is programmed to: receive a signal that the user computing devices have accessed the system to engage in a lyrical game and initiate a game; select a song from one of the plurality of songs stored in the memory of the server and identify portions of lyrics from the selected song to be replaced; send for display on the user computing devices the lyrics of the selected song with a visual indication of the identified lyrics to be replaced and a user input box for entering replacement lyrics for the identified lyrics, wherein the selection of the identified lyrics to replace then allows entry of replacement lyrics for the selected identified lyrics; receive replacement lyrics entered and store the replacement lyrics within the server corresponding to the selected identified lyrics and corresponding to each user computing device of the plurality of user computing devices; and determine a winner in response to analyzing the entered replacement lyrics from the plurality of user computing devices based on a scoring rubric.

Another embodiment includes a song writer system comprising: a server having a memory storing user information and song information including lyrics for a plurality of songs; and a plurality of user computing devices coupled to the server, wherein the server is programmed to: receive a signal that the user computing devices have accessed the system to engage in creation of a song; select a song from one of the plurality of songs stored in the memory of the server and identify portions of lyrics from the selected song to be replaced; send for display on the user computing devices the lyrics of the selected song with a visual indication of the identified lyrics to be replaced and a user input box for entering replacement lyrics for the identified lyrics, wherein the selection of the identified lyrics to replace then allows entry of replacement lyrics for the selected identified lyrics; receive replacement lyrics entered and store the replacement lyrics within the server corresponding to the selected identified lyrics and corresponding to each user computing device of the plurality of user computing devices; and analyze the replacement lyrics and send analysis of the replacement lyrics to the user computing device to alert the user to the replacement lyrics that are a good fit and the replacement lyrics that are a poor fit.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to song writer system for creating and/or modifying existing lyrics of songs as part of a game or otherwise utilizing artificial intelligent software. The system may include the use of a mobile application operating on a user computing device that may be a mobile computing device like a smartphone, a tablet, a wearable, and the like; and/or the system may operate on any type of computing device as a downloadable application or even as a web application.

Figure 1:
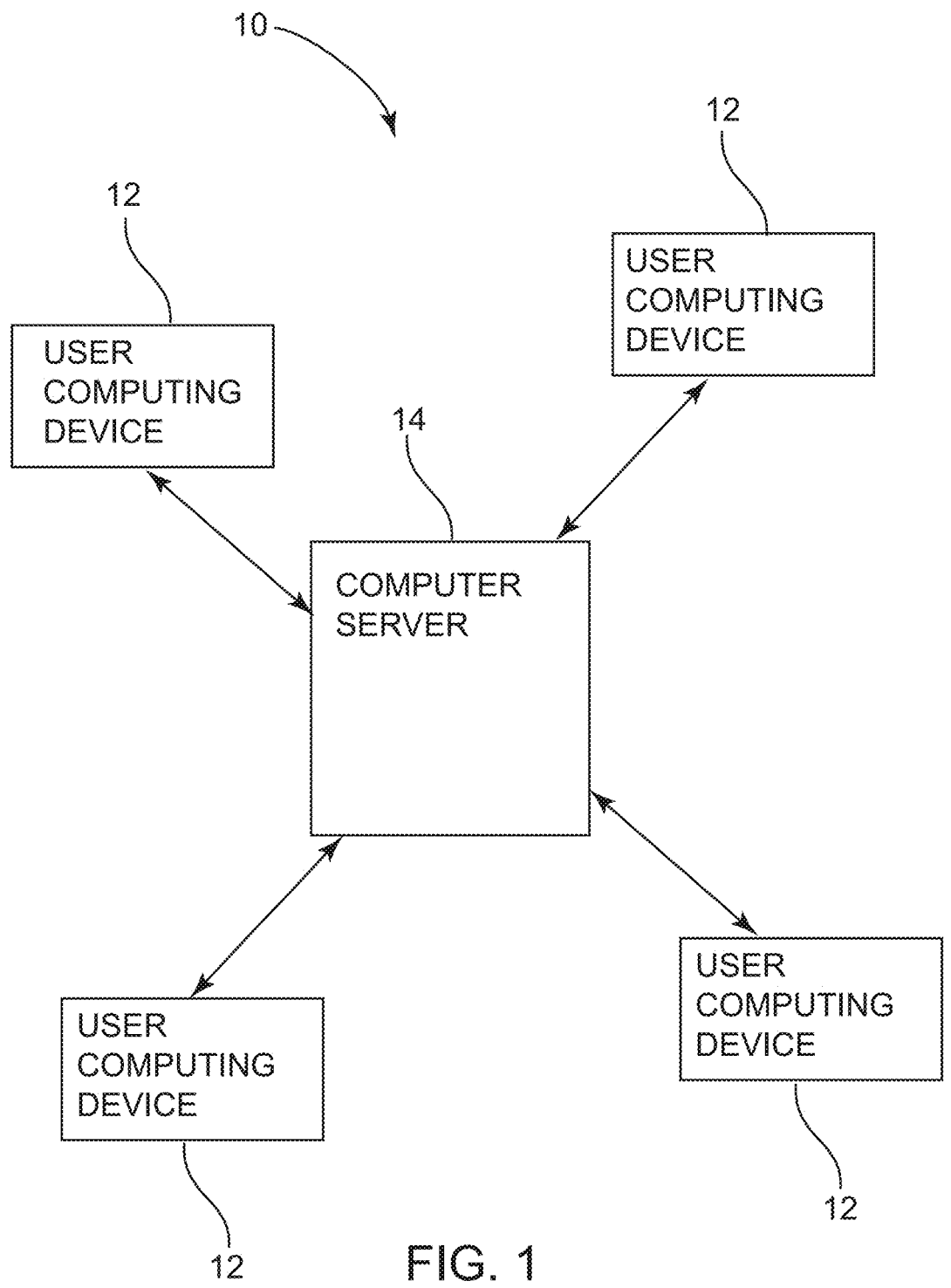
FIG. 1 a diagrammatic view of a song writer system according to an embodiment.

FIG. 1 depicts an embodiment of a song writer system 10. The system 10 may include a plurality of user computing devices 12 and a server 14, wherein the user computing devices 12 are coupled to the computer server 14. This coupling may be a network connection, such as a wireless connection through an Internet connection, a 5G connection, a Wi-Fi connection, a Bluetooth connection or the like, wherein each user computing device 12 may communicate with and receive communication from the server 14. Each user computing device 12 may include a desktop computer, a laptop, a tablet, a smartphone, wearable devices and the like. The server 14, in some embodiments, may be a computer server or a cloud-based infrastructure architecture.

The server 14 may include a memory storing various data. The memory of the server 14 may store user information, such as demographic information, and may further store song/lyric input contributions given and received relating to each creator and the demographic information of the creator (s).

Figure 2A:
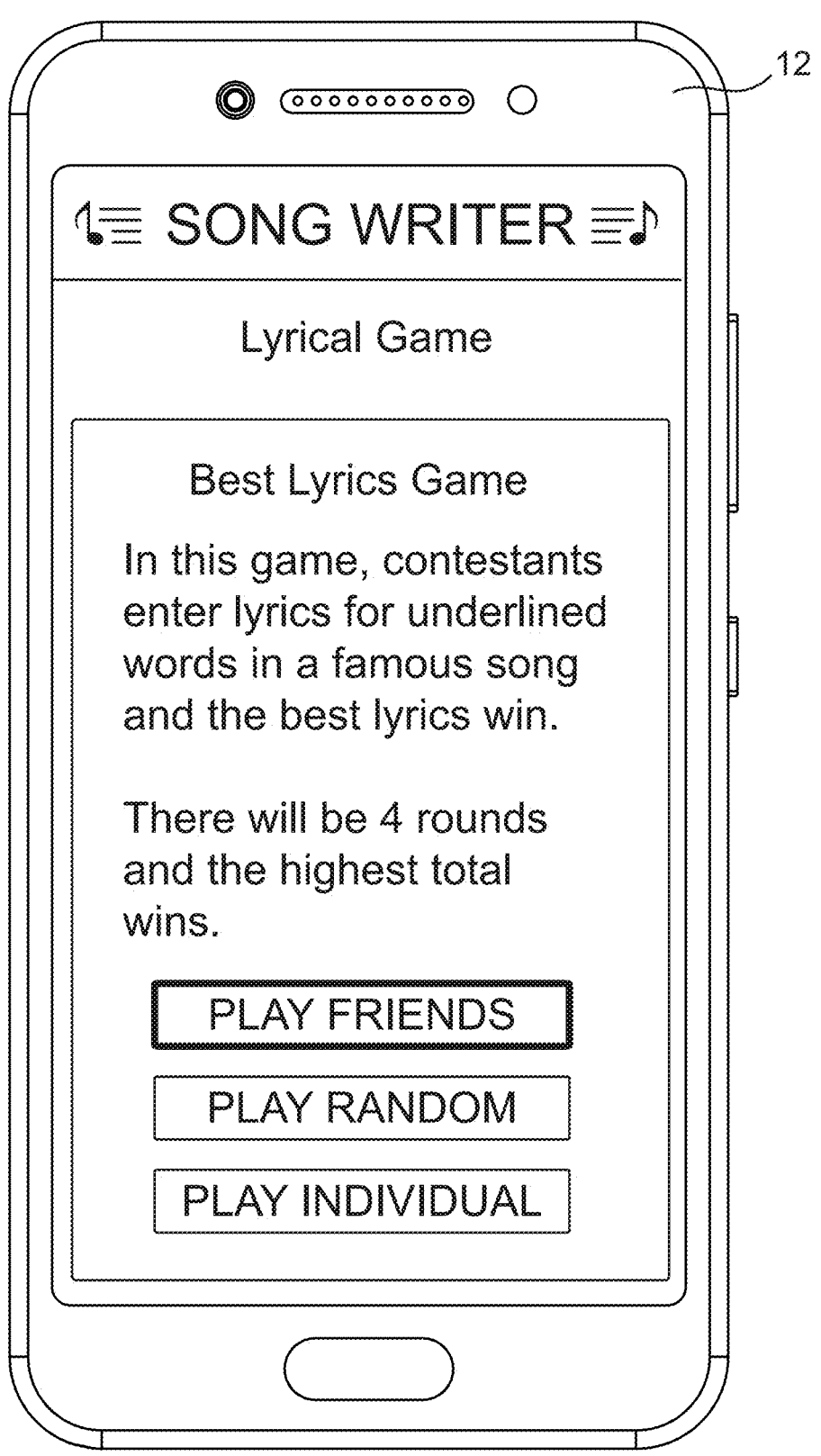
FIG. 2A depicts a user computing device with a user interface accessing a song writer system for playing a game according to an embodiment.
Figure 2B:
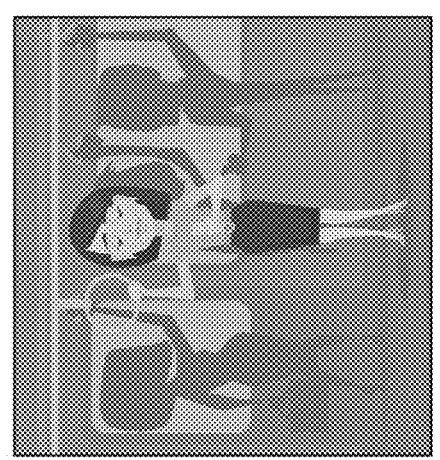
FIG. 2B depicts a group of users operating their own user computing device to access a song writer system for playing a game according to an embodiment.
Figure 2B:
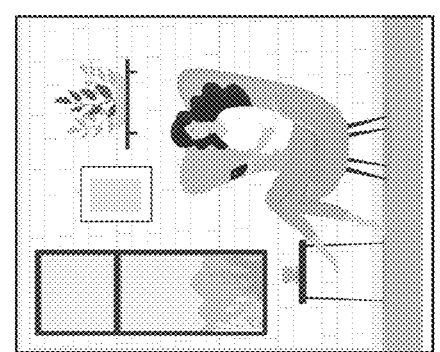
Figure 2B:
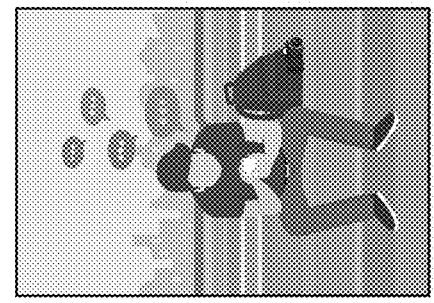
Figure 2B:
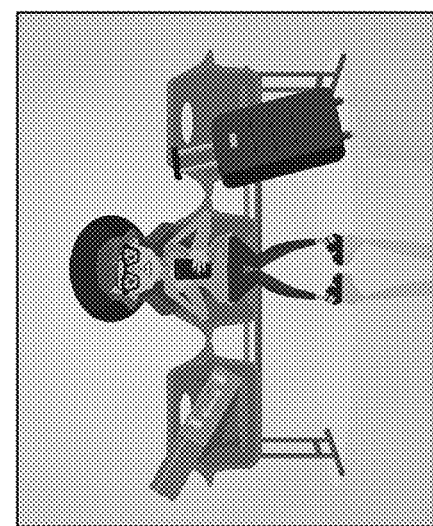
Figure 2C:
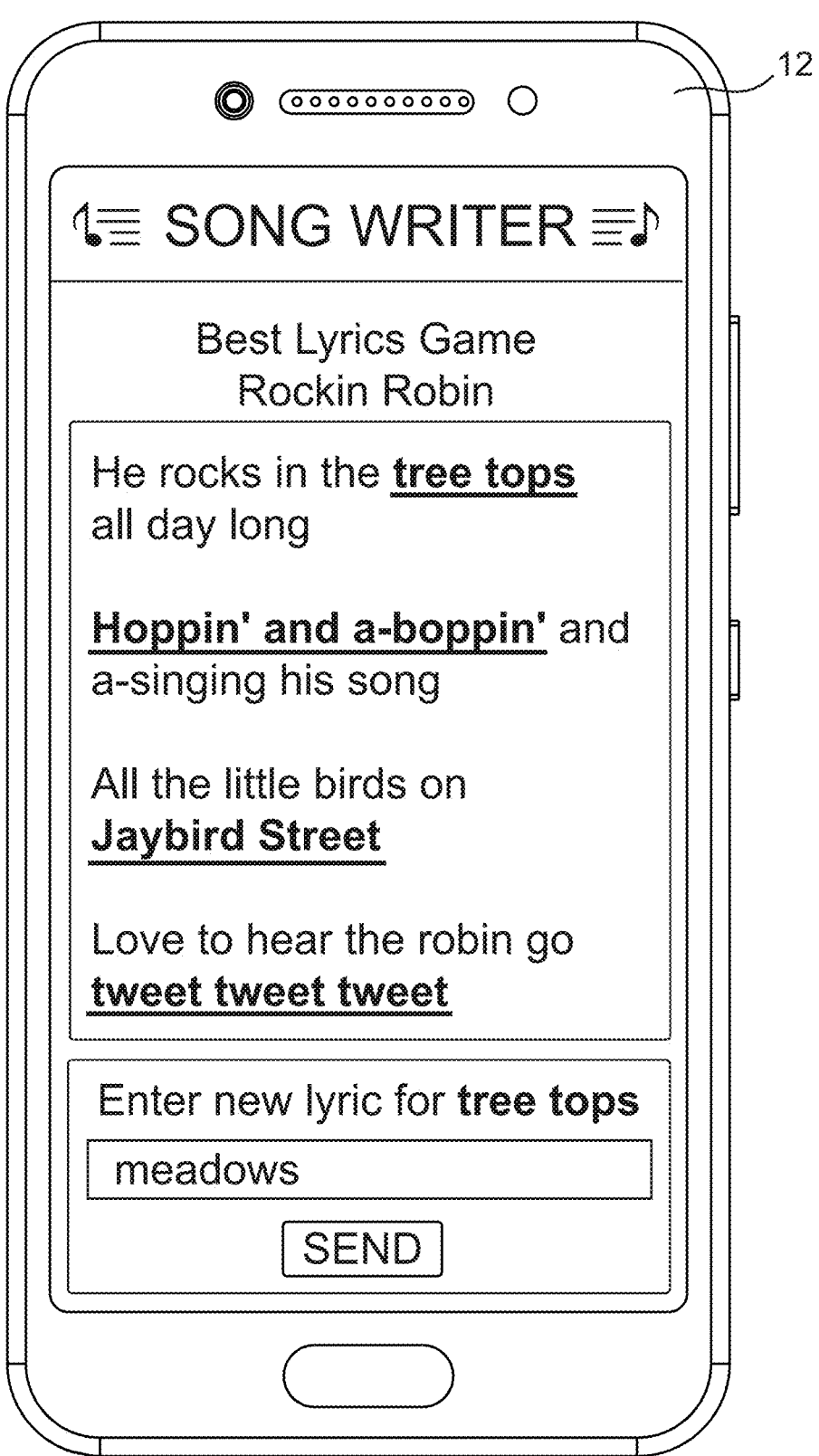
FIG. 2C depicts a user computing device with a user interface accessing a song writer system for playing a game according to an embodiment.
Figure 2D:
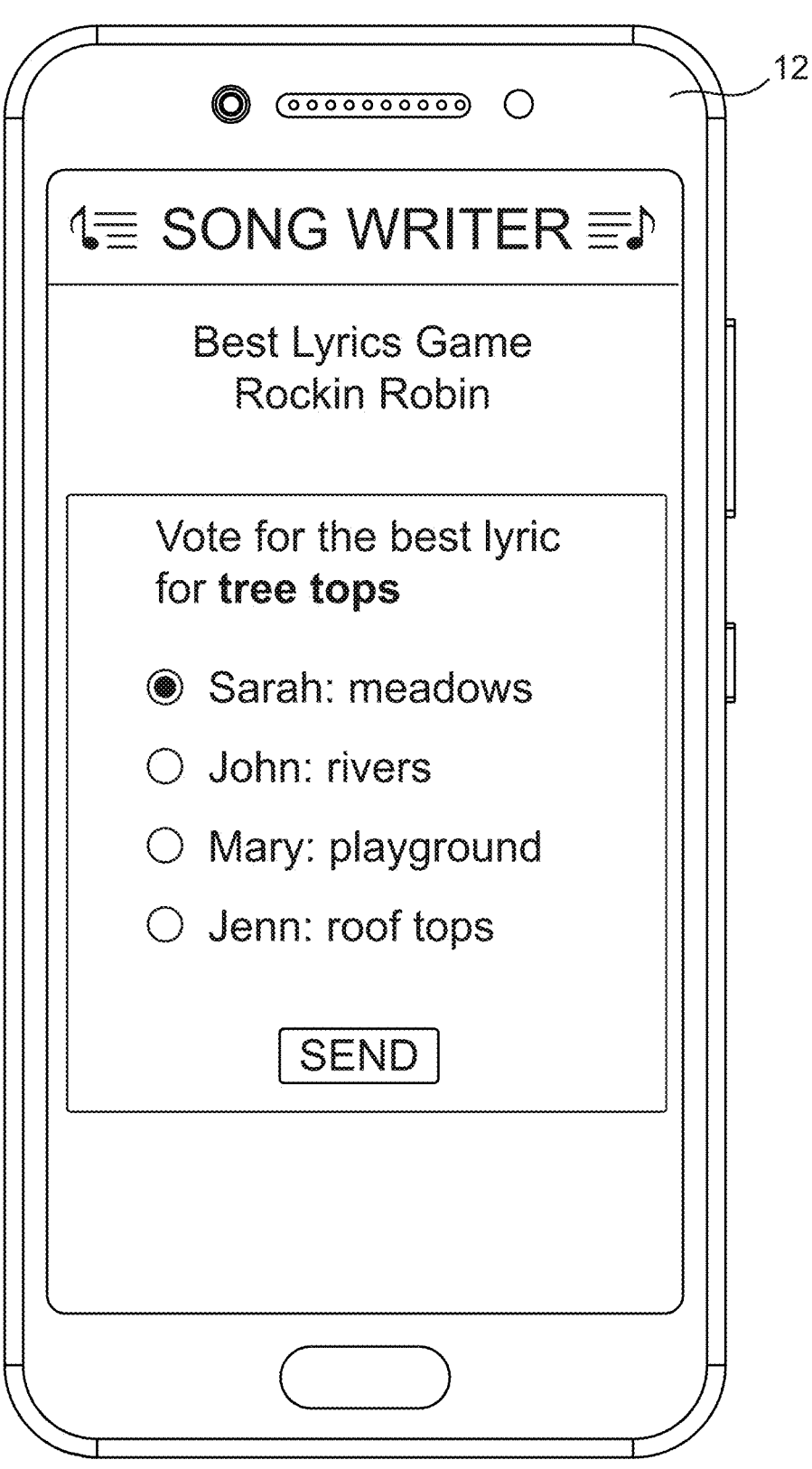
FIG. 2D depicts a user computing device with a user interface accessing a song writer system for playing a game according to an embodiment.
Figure 2E:
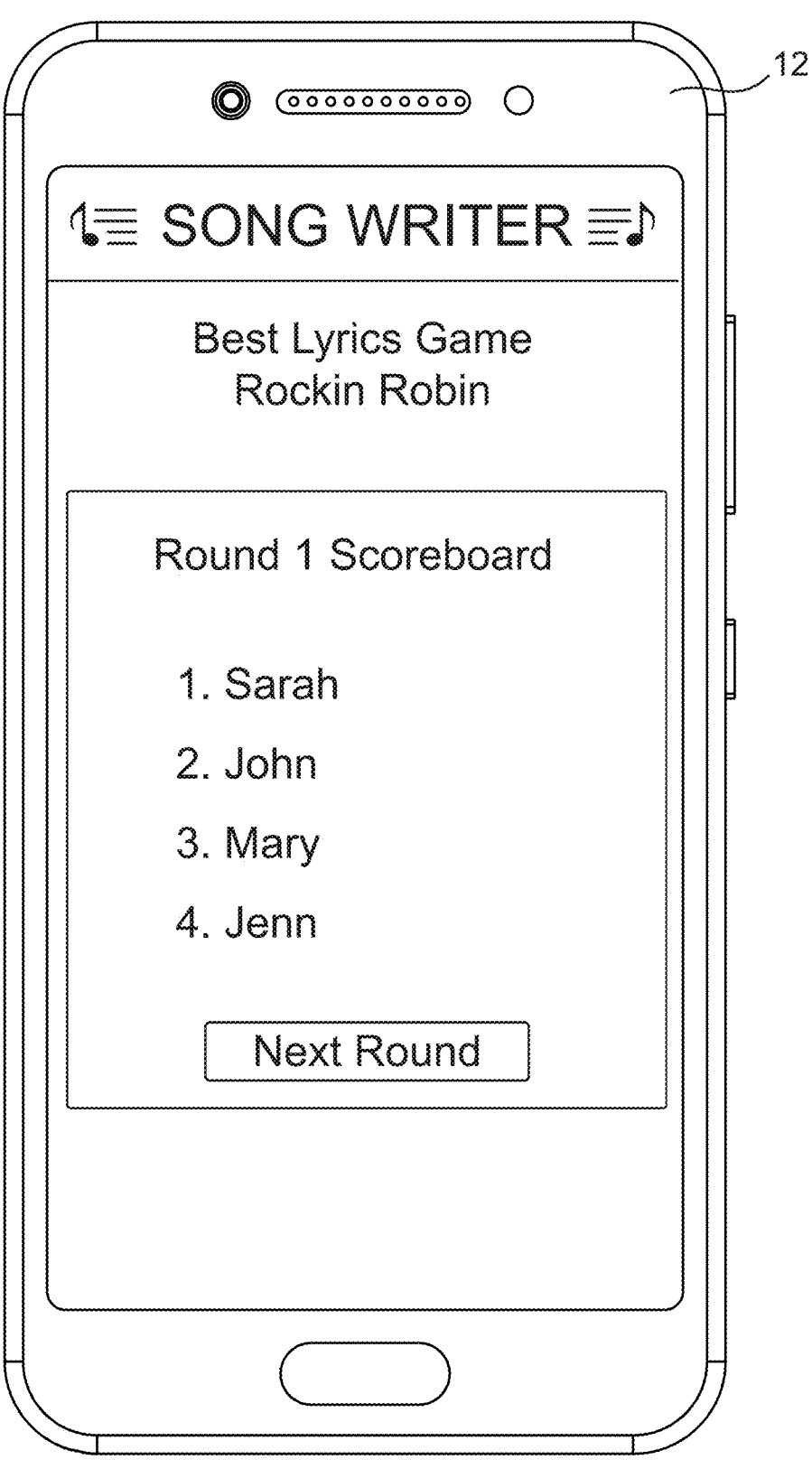
FIG. 2E depicts a user computing device with a user interface accessing a song writer system for playing a game according to an embodiment.
Figure 2F:
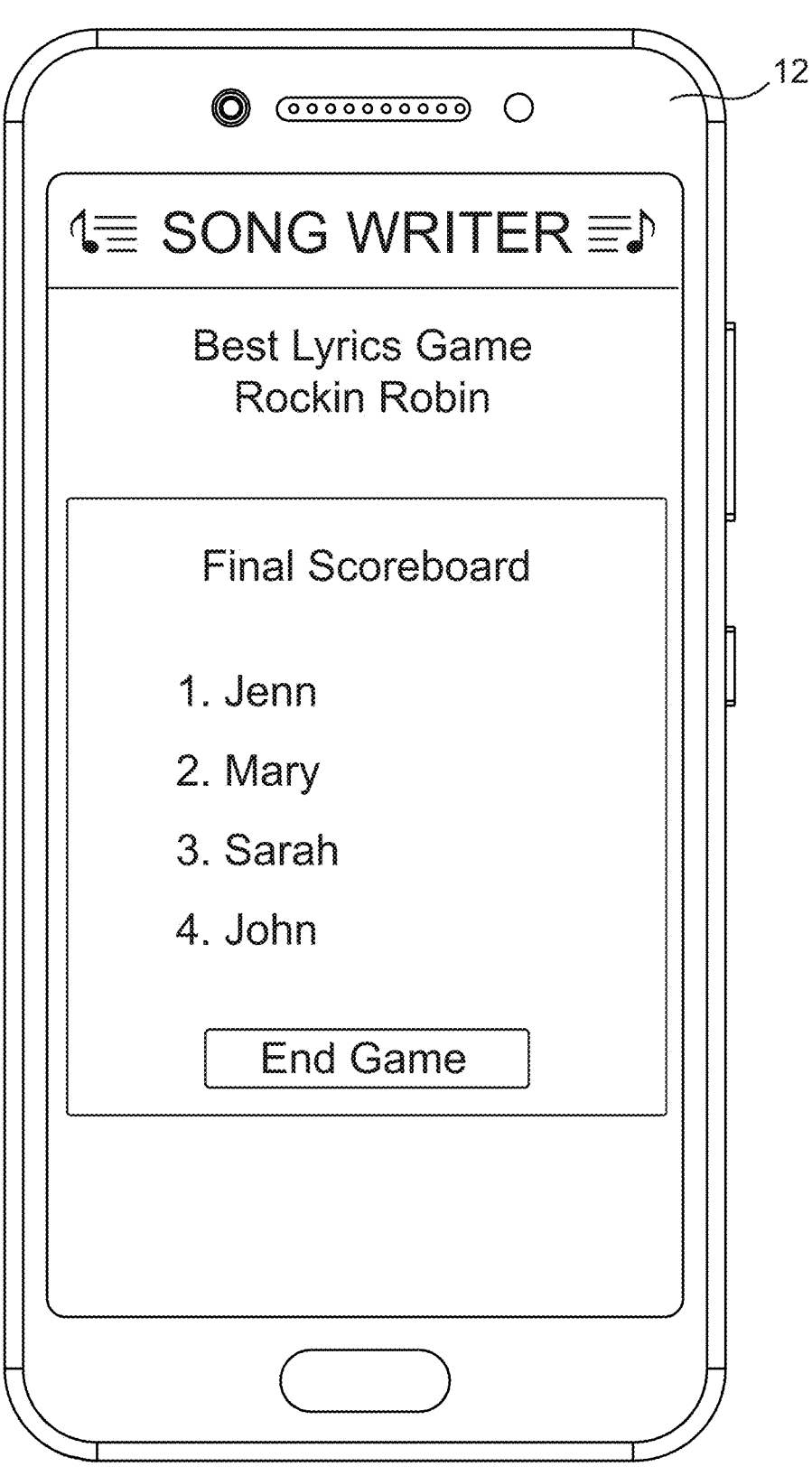
FIG. 2F depicts a user computing device with a user interface accessing a song writer system for playing a game according to an embodiment.

Referring to the drawings again, FIGS. 2A-2H depict an embodiment of the system 10 that includes one or more user computing devices 12 coupled to the server 14 to participate in a game utilizing the system 10. As shown in FIG. 2A, a user may access the system 10 through an application, website, web app or the like wherein a user interface is shown displayed on the user computing device 12. The game depicted in FIGS. 2A-2F are an example of a game and not intended to be a limitation on the only type of game that can utilize the system for play. For example, FIG. 2A depicts a user interface that may provide instruction how to play the game and various options for game play, such as, "Play Friends," "Plat Random," and "Play Individual." In an example, the user may select to play with friends and the friends join, such as that shown in FIG. 2B. In some embodiments, the lyrics of a song may be displayed on the user computing device 12 as sent from the server 14, wherein certain lyrics identified as lyrics to replace, such as the bold underlined lyrics in FIG. 2C. The user may then select the lyrics to replace and the user computing device 12 may display an input interface for entering a new lyric to replace the elected lyric. The user may then select send or a similar button to send the entered new lyric to the server 14. This may be repeated for each lyric that is identified as needing to be replaced within the song. After every identified lyric has been replaced, or individually after each input for an identified lyric has been input by all contestants or users, the server may send for display on the user computing device 12 of each user playing the game to vote on the inputted lyrics they like the best, as shown in FIG. 2D. Based on the votes entered by the users playing the games, the server 14 may then send for display on the user computing device 12 a listing of the highest vote getter on a scoreboard as shown in FIG. 2E. The server may then be programmed to accumulate the score for each word or round and display an overall winner, such as FIG. 2F.

Figure 2G:
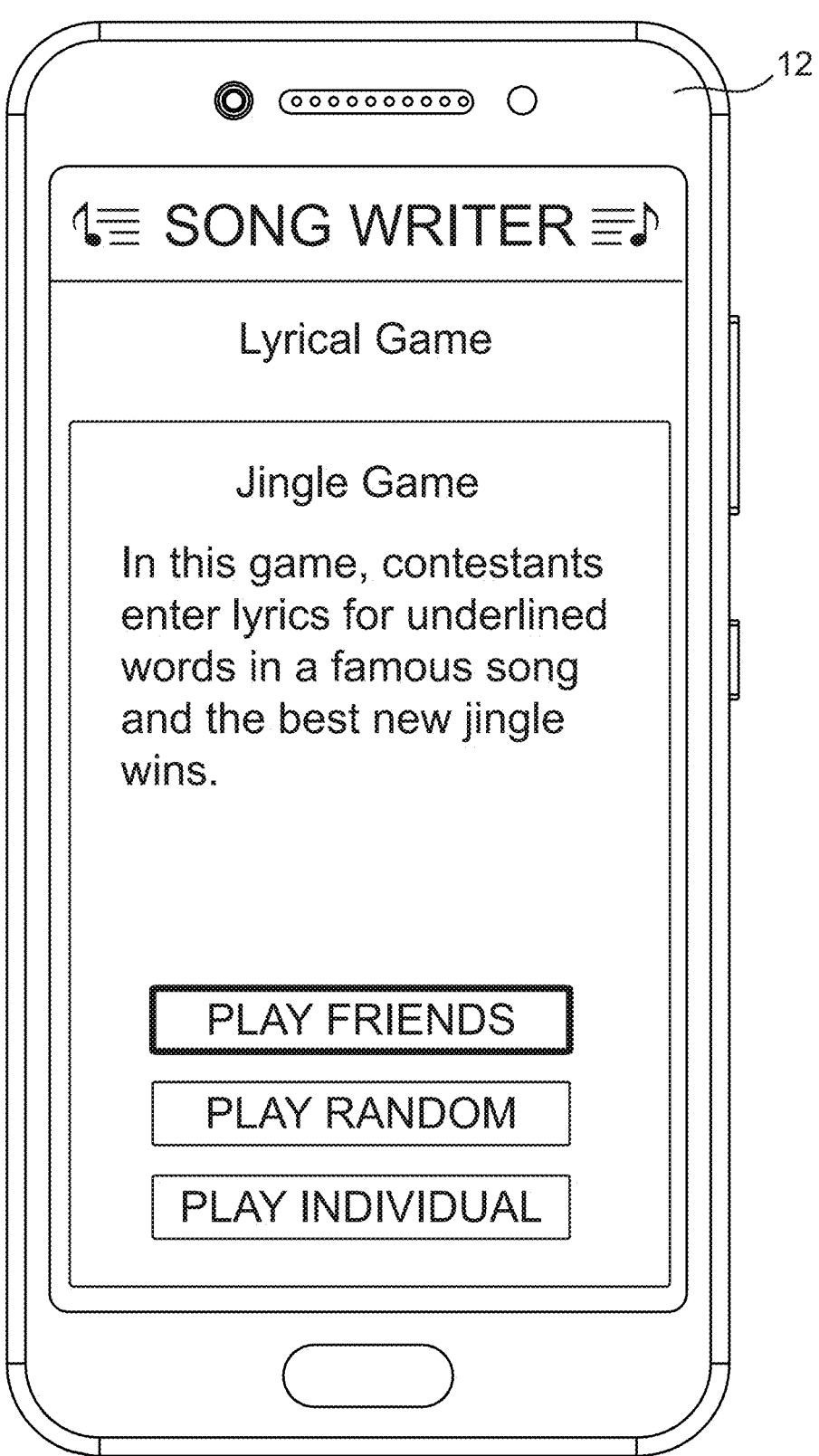
FIG. 2G depicts a user computing device with a user interface accessing a song writer system for playing a game according to an embodiment.
Figure 2H:
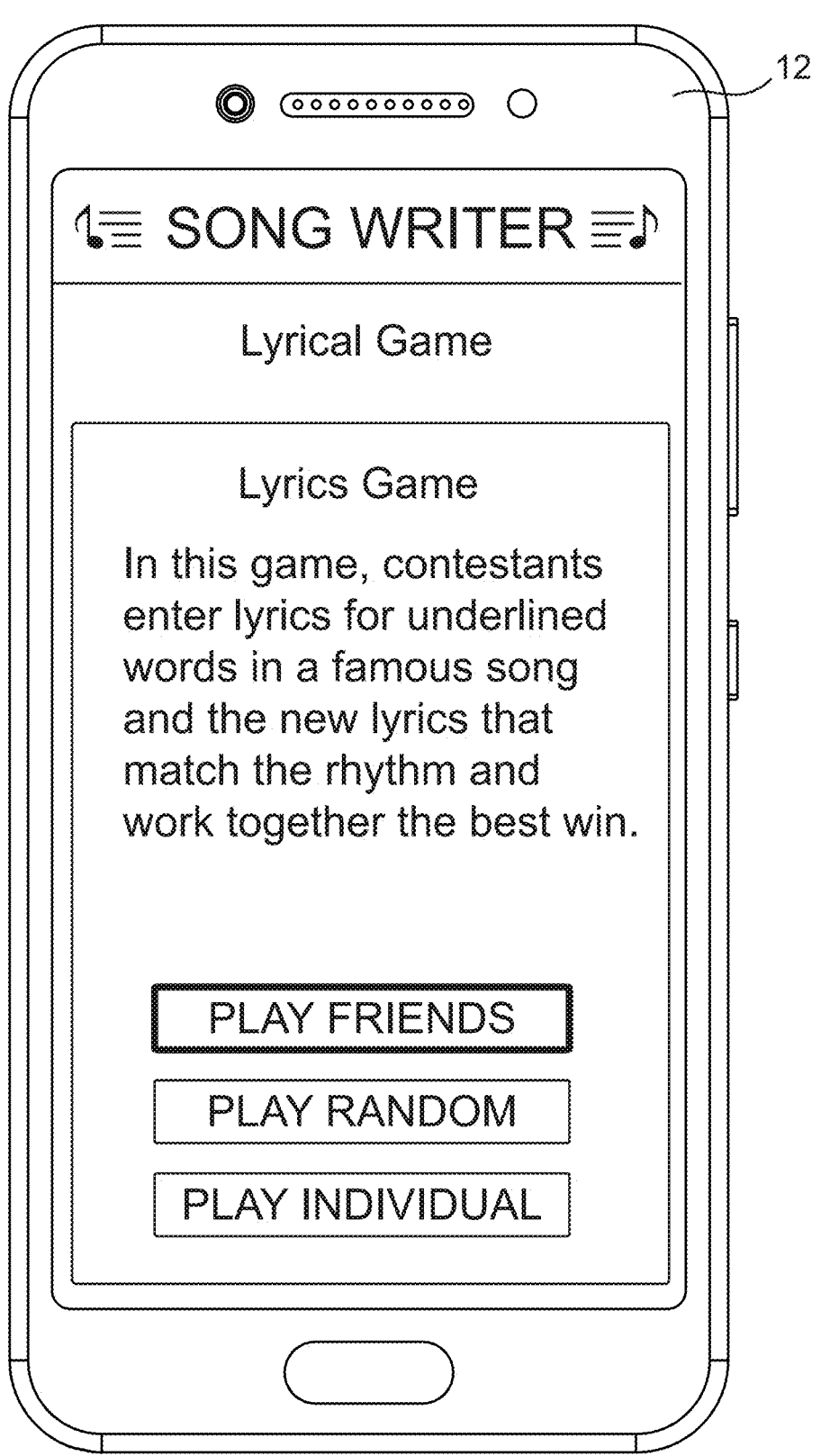
FIG. 2H depicts a user computing device with a user interface accessing a song writer system for playing a game according to an embodiment.

In other embodiments, different games may be played, such as choosing the funniest lyrics, as shown in FIG. 2G, or choosing lyrics that match rhythm and work best together as shown in FIG. 2H. It will be understood that many different games may be provided by the system 10 that allows users to enter or input replacement lyrics for system identified lyrics and then utilize the entered or input lyrics from user computing devices 12 to determine a winner, wherein the server 14 operates to determine the winner. This may be done by additional user input through voting and so forth. However, it will be understood that the system 10 may include a server 14 operating artificial intelligence software, such as machine learning software, wherein the server may be programmed to determine what lyrics are best based on learned input over time, references to historical languages, databases of funny words and so forth. The server 14 may be programmed to analyze lyrics input to determine if it matches the rhythm of the original lyrics, if it corresponds to the additional inputted lyrics of the song through user computing devices 12, to determine if words rhyme at the ends of lines of lyrics, to determine if the new lyrics form a cohesive theme and so forth. This analysis can then be utilized to determine what lyrics are the best for the game being played. The artificial intelligence software on the server 14 operates to allow a user to play games when he or she does not have others to play against and allows the server 14 to determine how the user scores. It will further be understood that while voting by users allows for conventional scoring of games, it will be understood that the artificial intelligence software may operate to apply a scoring rubric that can provide points for unique words, correct rhythm, rhyming, theme and so forth, wherein the type of game can use one or more scoring rubric to weight the score and determine a value for the input lyrics and provide a comparative score.

Another embodiment of the invention is provided for in FIGS. 3-12F, wherein the song writer system 10 operates to allow users to create songs and customize the lyrics for specific purposes, people, events and so forth. In operation, the server 14 may be programmed to send for display and receive input from the user computing device 12 the elements depicted in FIGS. 3-12F.

Figure 3:
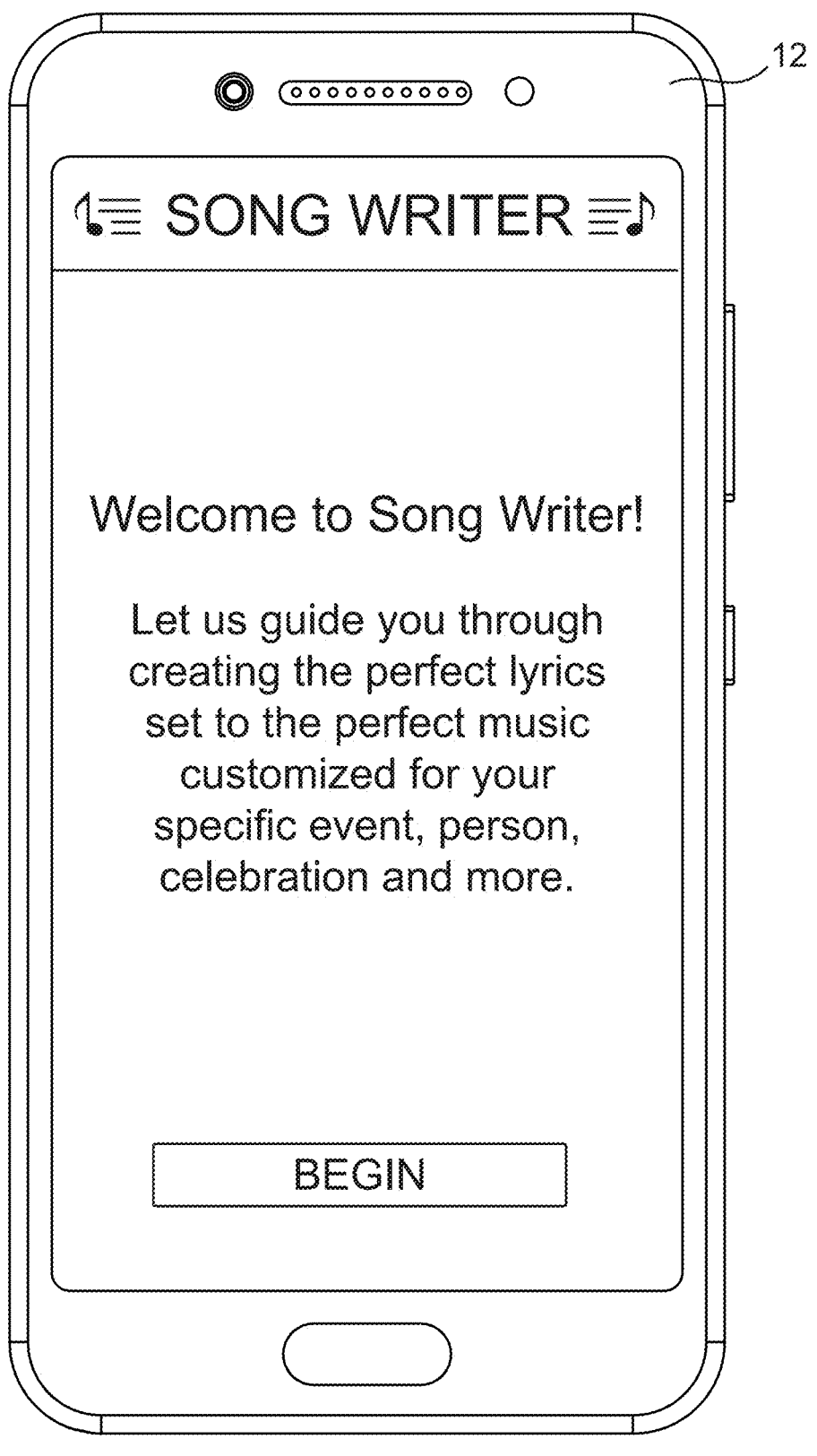
FIG. 3 depicts a user computing device with a user interface accessing a song writer system for creating song lyrics according to an embodiment.
Figure 4:
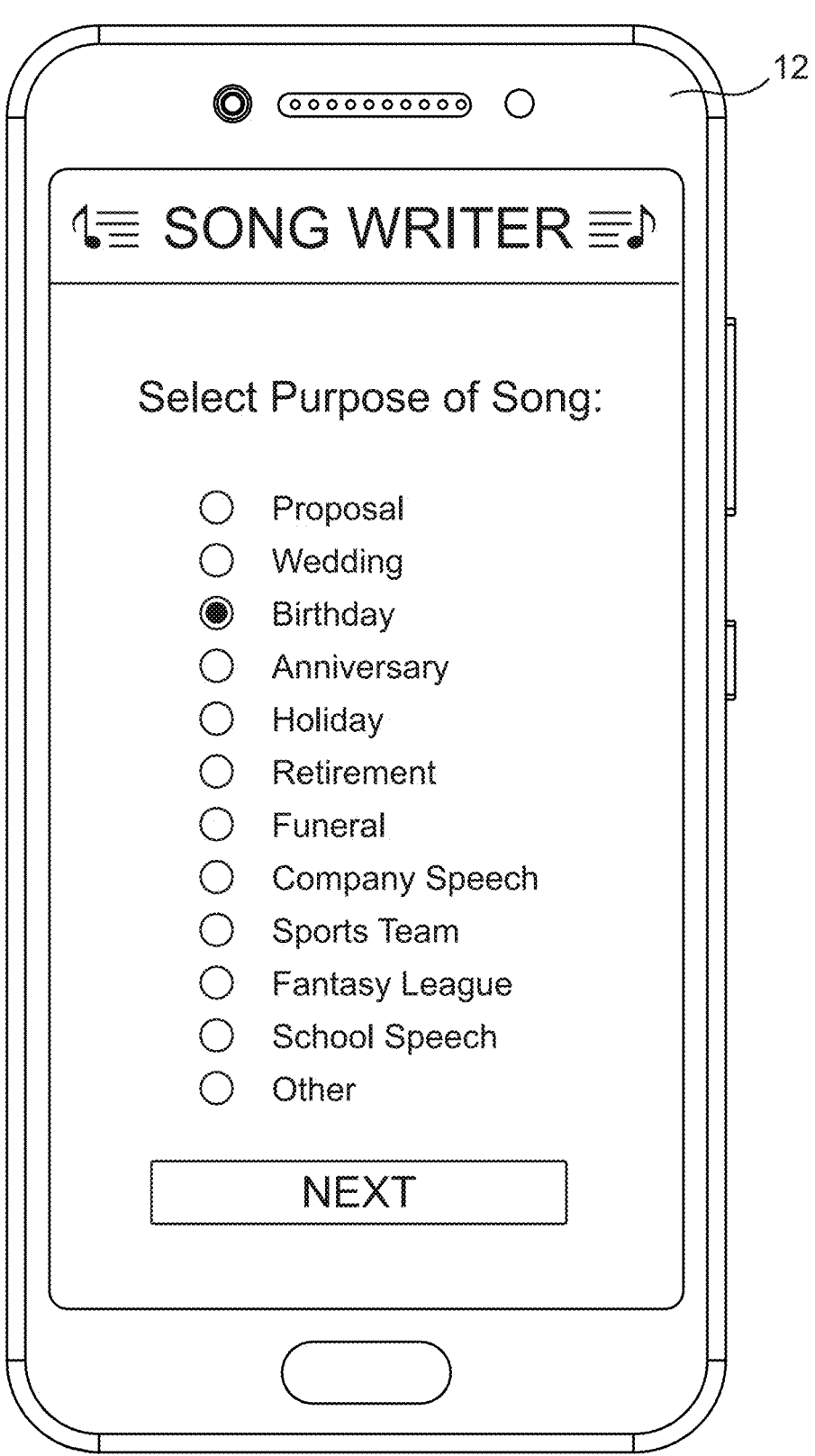
FIG. 4 depicts a user computing device with a user interface accessing a song writer system for creating song lyrics according to an embodiment.
Figure 5:
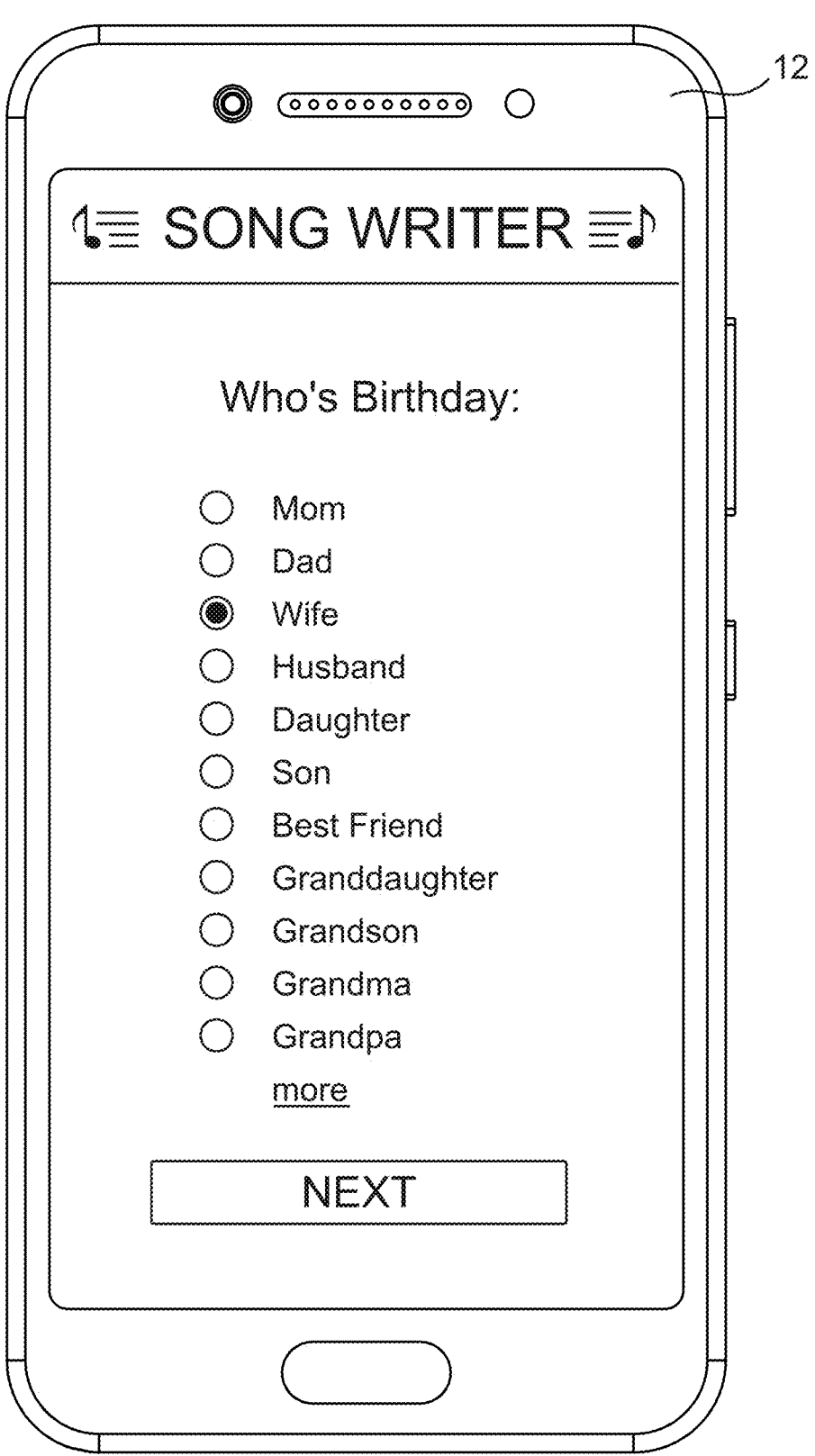
FIG. 5 depicts a user computing device with a user interface accessing a song writer system for creating song lyrics according to an embodiment.
Figure 6:
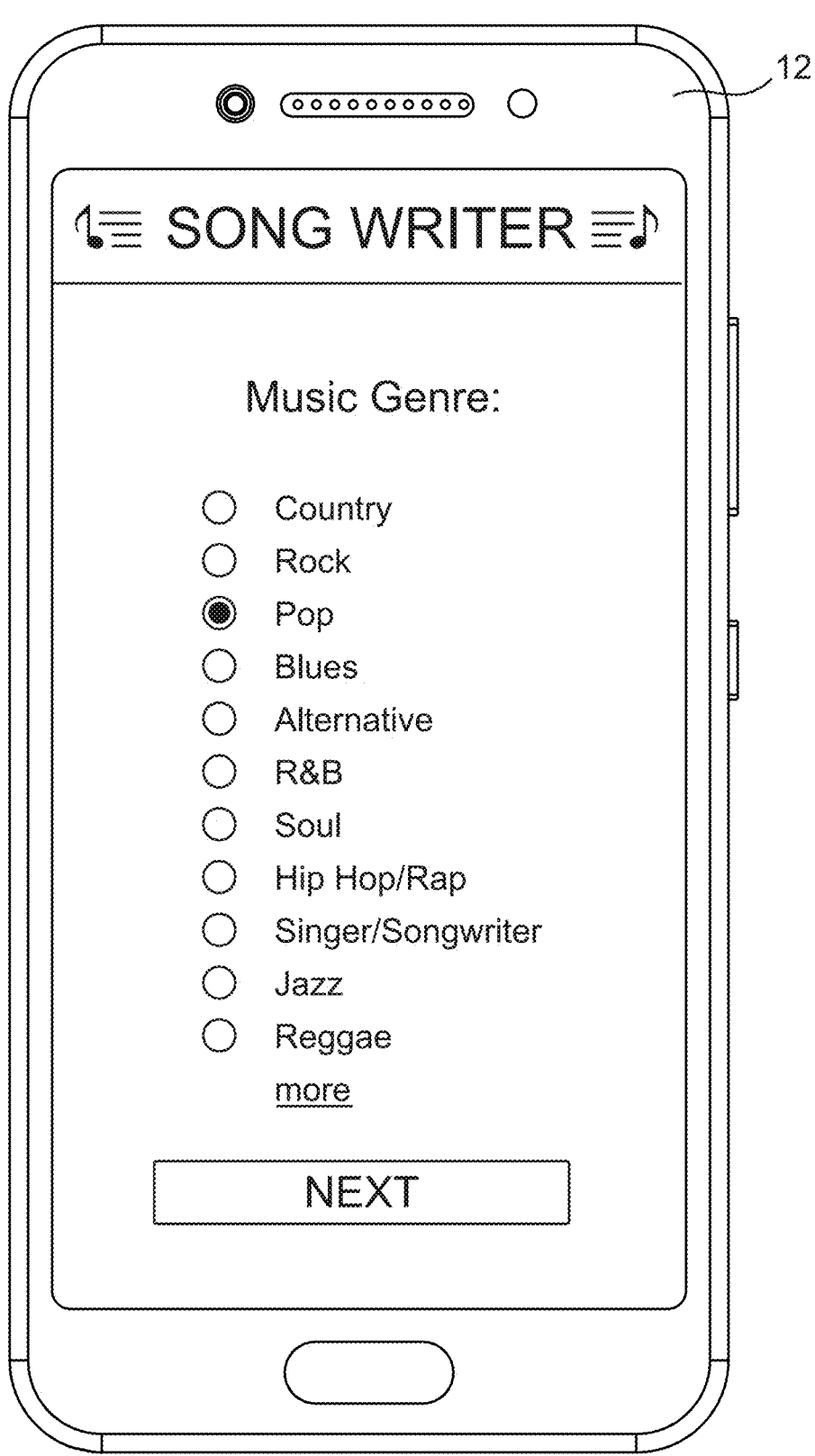
FIG. 6 depicts a user computing device with a user interface accessing a song writer system for creating song lyrics according to an embodiment.
Figure 7:
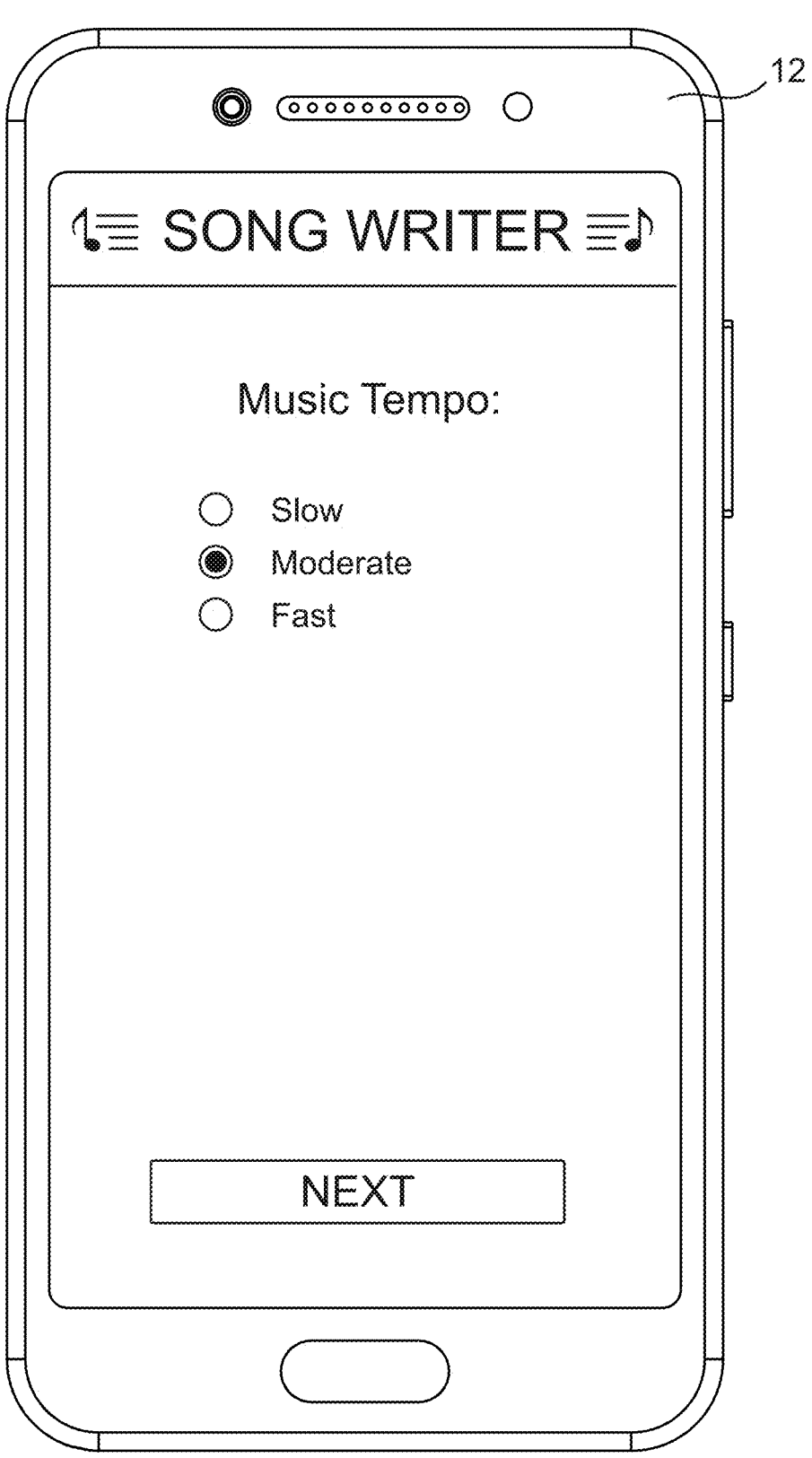
FIG. 7 depicts a user computing device with a user interface accessing a song writer system for creating song lyrics according to an embodiment.
Figure 8:
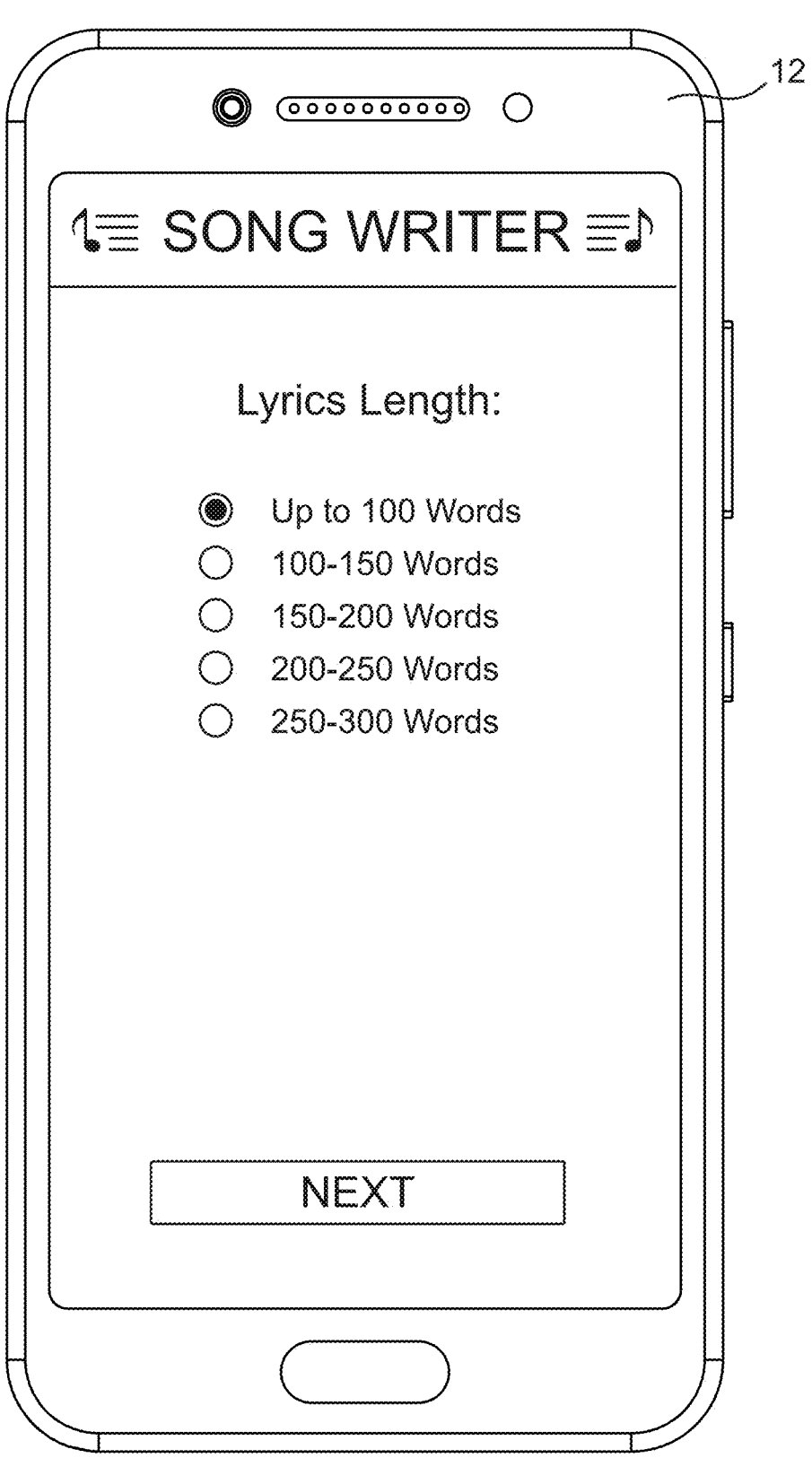
FIG. 8 depicts a user computing device with a user interface accessing a song writer system for creating song lyrics according to an embodiment.
Figure 9:
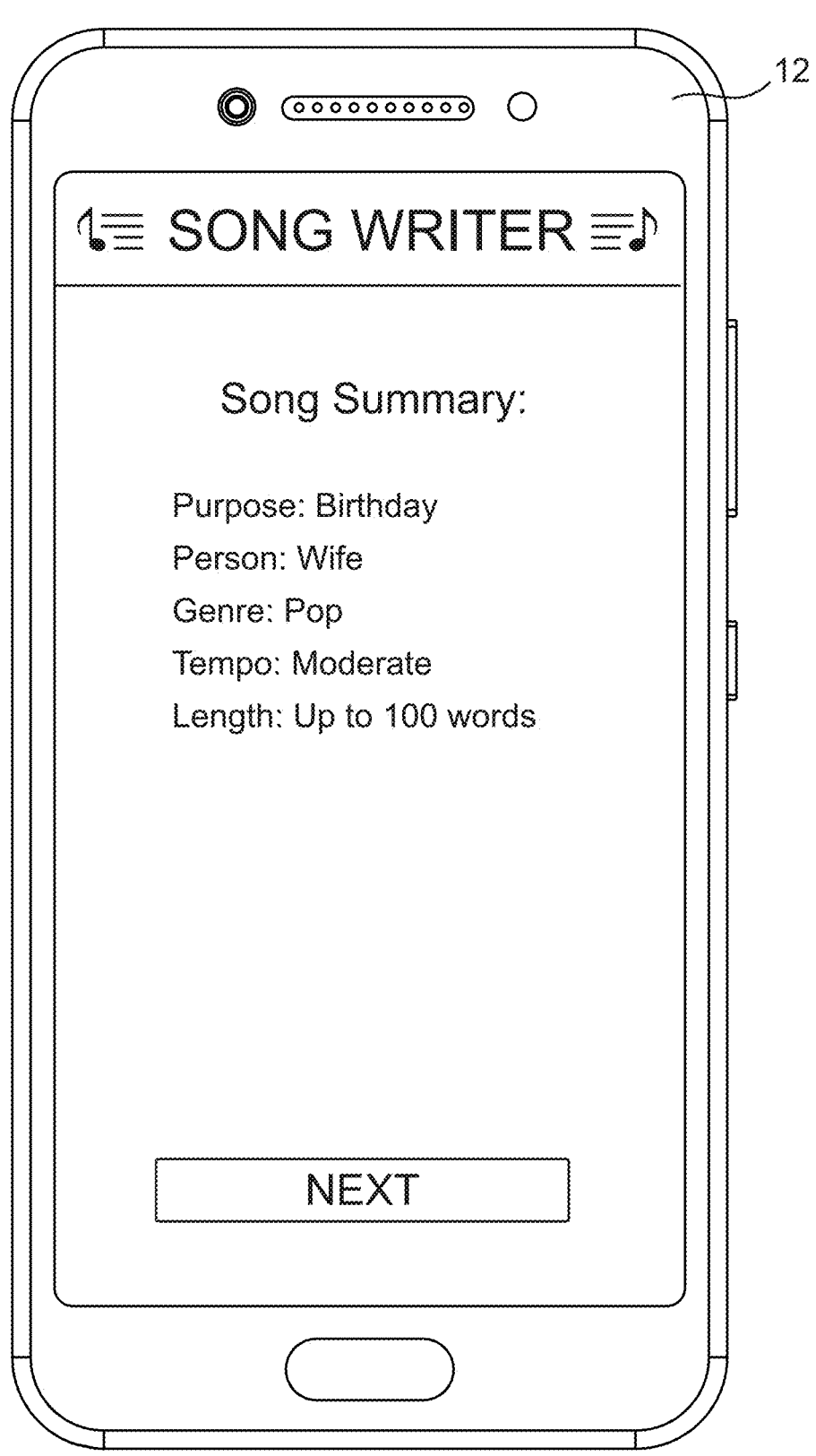
FIG. 9 depicts a user computing device with a user interface accessing a song writer system for creating song lyrics according to an embodiment.
Figure 10:
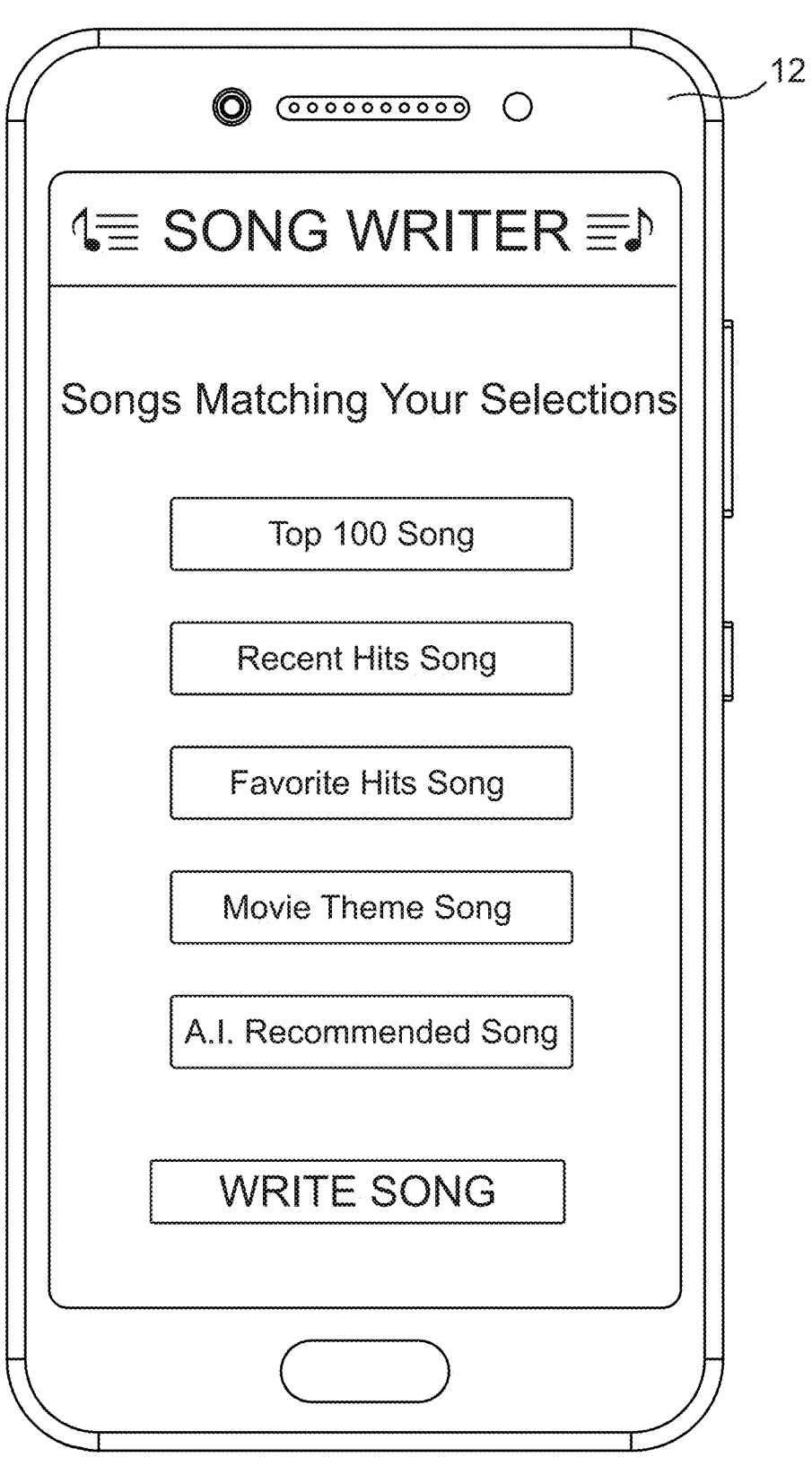
FIG. 10 depicts a user computing device with a user interface accessing a song writer system for creating song lyrics according to an embodiment.
Figure 11:
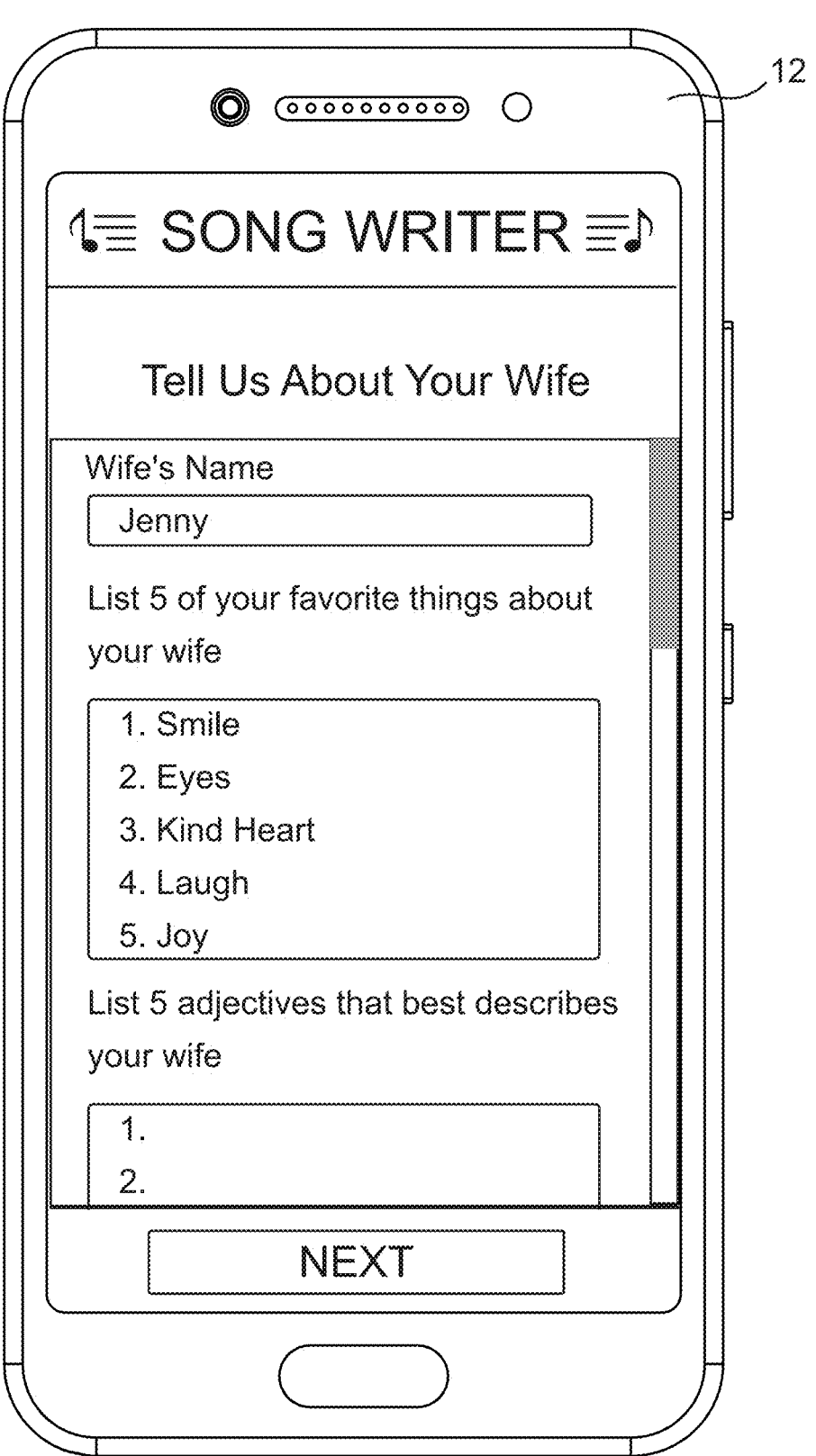
FIG. 11 depicts a user computing device with a user interface accessing a song writer system for creating song lyrics according to an embodiment.

The server 14 may be programmed to receive a signal that the user computing device 12 is accessing the system, such as the user selecting begin on a user interface as depicted in FIG. 3. The server 14 may send for display on the user computing device 12 a user interface a series of interfaces for creating a song using the system 10. This may include selecting a purpose of the song that includes, but is not limited to, the purposes depicted in FIG. 4 on the user computing device 12. The user may then select an individual the song is being created for, such as depicted on user computing device 12 in FIG. 5. The user may then select the music genre as depicted on user computing device 12 in FIG. 6. In embodiments as shown in FIG. 7, the user computing device 12 may display tempos for one to be selected for the new song being created. Some embodiments may send a prompt to select the number of words in the song lyrics, as shown in FIG. 8. In embodiments, the server 14 may be programmed to send for display on the user computing device 12 a summary of the selections of the user sent to and stored on the server 14, as displayed in FIG. 9. The server 14 may be programmed to send for display on the user computing device 12, as shown in FIG. 10, various songs matching the selected criteria for the song, criteria such as that as shown in FIGS. 3-9. The songs may include Top 100 Songs, Recent Hits Songs, Favorite Hits Songs, Movie Theme Songs, Artificial Intelligence Recommended Songs, and the like. After selecting a song, the user may select to write the song. The system 10 may include the server 14 sending for display and input by the user computing device 12 to include questions regarding characteristics and specific information of the person, purpose, or the like criteria entered by the user, such as the person being displayed in FIG. 11.

Figure 12A:
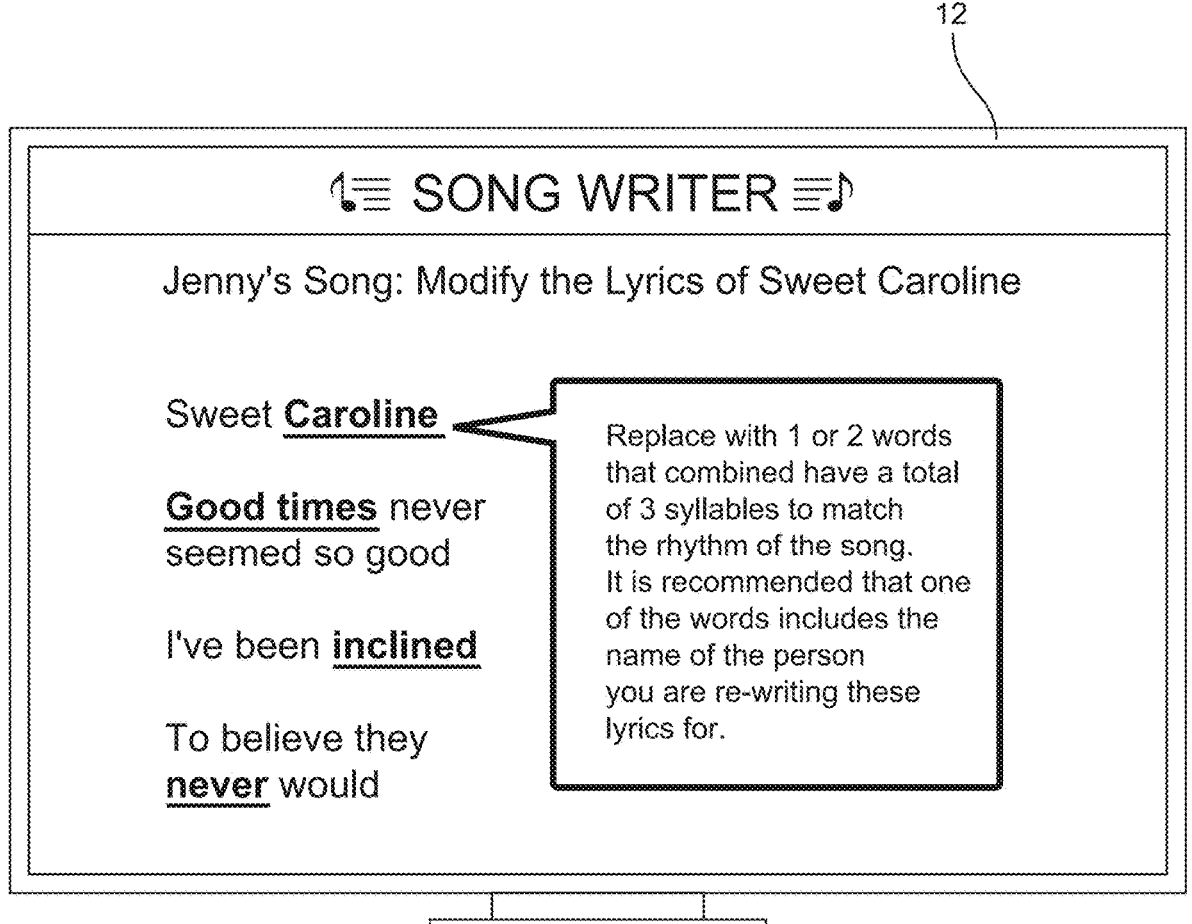
FIG. 12A depicts a user computing device with a user interface accessing a song writer system for creating song lyrics according to an embodiment.
Figure 12B:
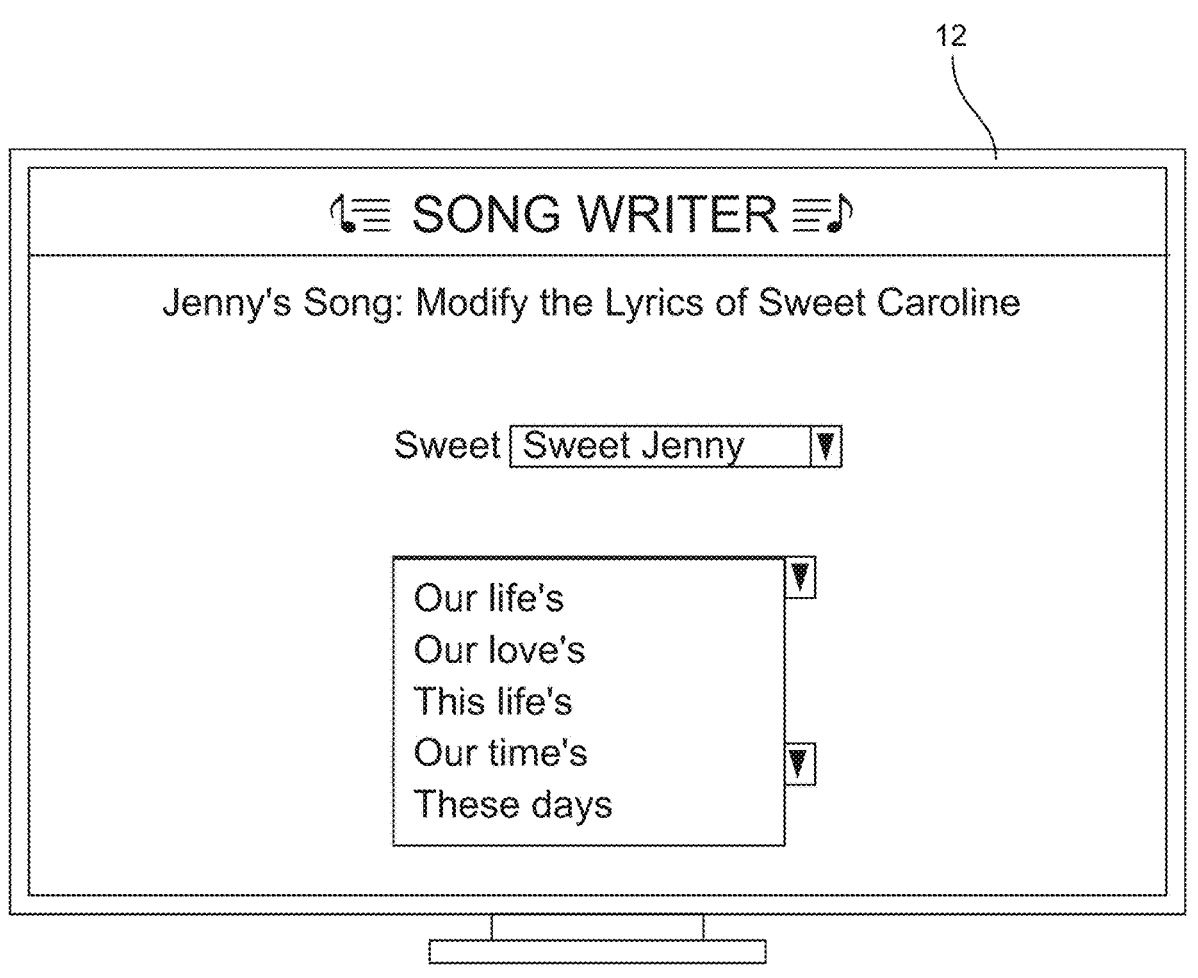
FIG. 12B depicts a user computing device with a user interface accessing a song writer system for creating song lyrics according to an embodiment.
Figure 12C:
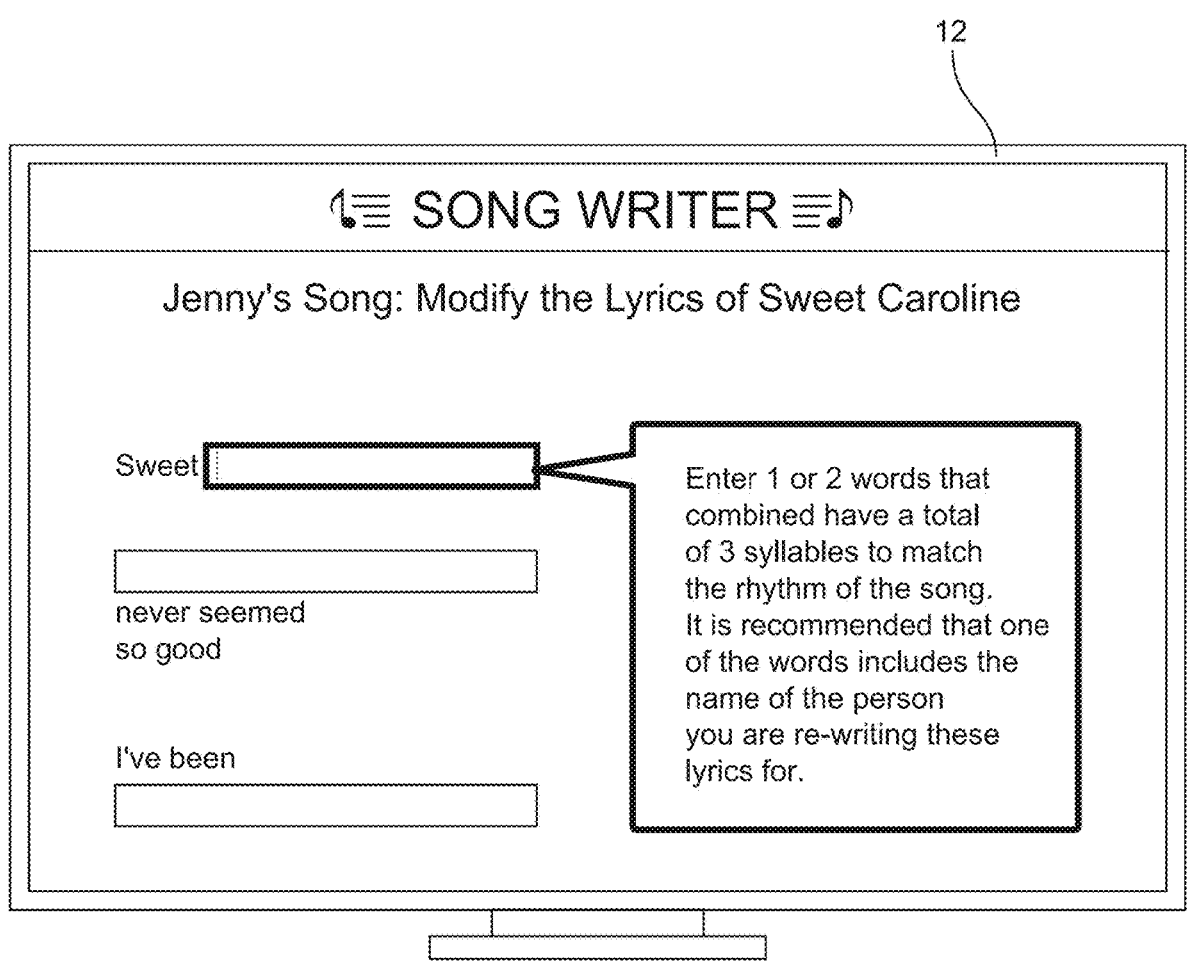
FIG. 12C depicts a user computing device with a user interface accessing a song writer system for creating song lyrics according to an embodiment.
Figure 12D:
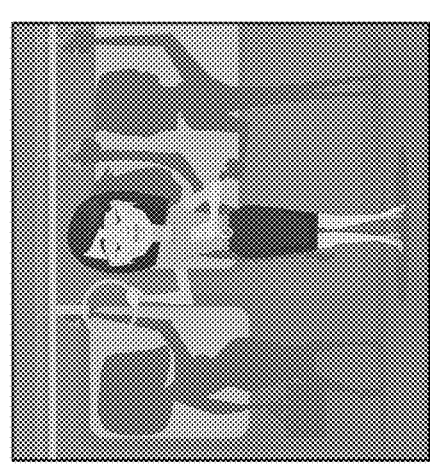
FIG. 12D depicts a user computing device with a user interface accessing a song writer system for creating song lyrics according to an embodiment.
Figure 12D:
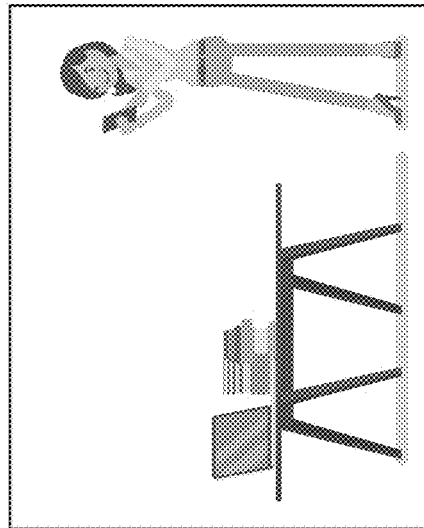
Figure 12D:
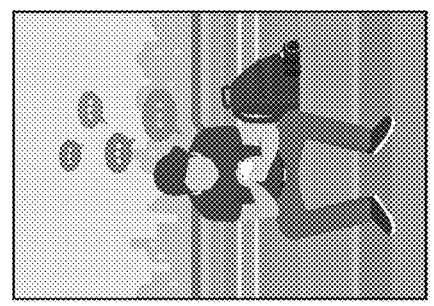
Figure 12D:
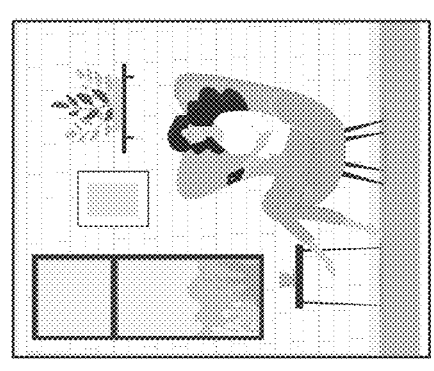
Figure 12D:
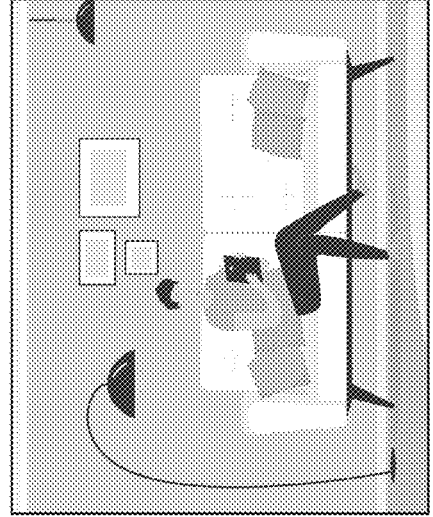
Figure 12D:
Figure 12D:
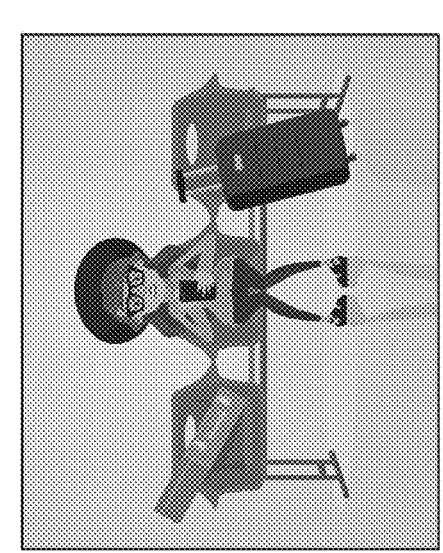

Once the system 10 gathers information, the server 14 may send for display on user computing device 12 lyrics of the selected song. In some embodiments, as shown in FIG. 12A, the server 14, operating artificial intelligence software, may send the lyrics of the song with the portions of the lyrics identified for replacement, such as the lyrics shown in bold and underlined. The portions of the lyrics to replace may be determined by the server 14 in analyzing the lyrics and selecting the options that are best modified for the purpose and/or person. This may be provided to the user, such as by bubble of help text related to the text box, such as, the number of words, number of syllables and any recommendations for the type of text to insert within the text box. This may be accomplished by the artificial intelligence software operated by the server 14. In another embodiment, the server 14, operating artificial intelligence software, may send the lyrics of the song with the portions of the lyrics with drop down boxes, as shown in FIG. 12B. In this embodiment, the server 14 is programmed to process the entered information from the user stored in the server 14 and the lyrics of the song to interpret the rhythm, syllables, and the like for the portions of the lyrics identified to replace. The server 14 may be programmed to determine the best portions of the lyrics to modify and create the drop-down options for the user to select. In another embodiment, as shown in FIG. 12C the lyrics may include text boxes for the user to insert lyrics to replace lyrics removed by the server. The server 14 may be programmed to identify the rhythm, syllables, and the like for the portions of the text removed by the server 14 for replacement by the user. The portions of the lyrics to replace may be determined by the server 14 in analyzing the lyrics and selecting the options that are best modified for the purpose and/or person. This may be provided to the user, such as by bubble of help text related to the text box, such as, the number of words, number of syllables and any recommendations for the type of text to insert within the text box. This may be accomplished by the artificial intelligence software operated by the server 14. It will be further understood that this may be a group effort as depicted in FIG. 12D.

Figure 12E:
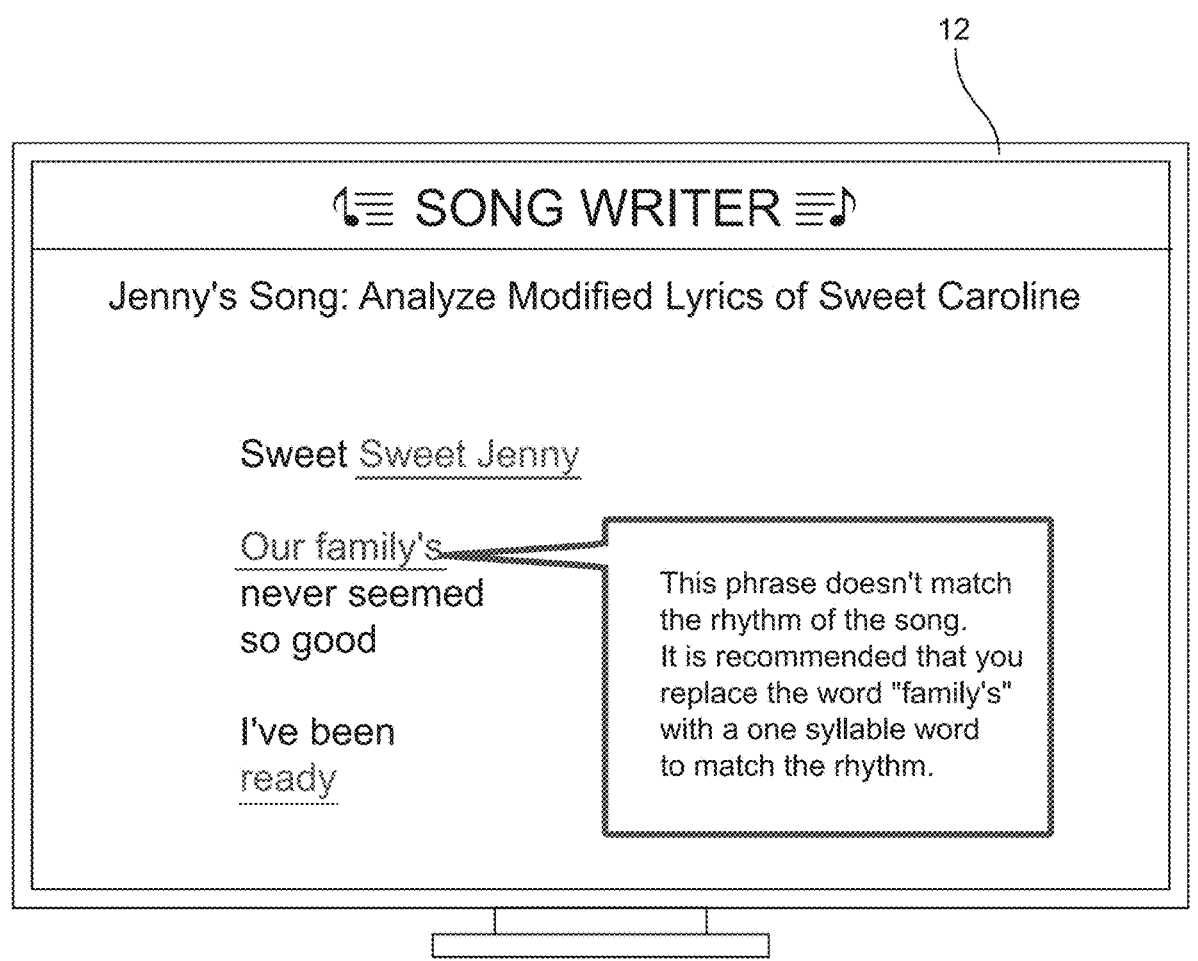
FIG. 12E depicts a user computing device with a user interface accessing a song writer system for creating song lyrics according to an embodiment.

Once all of the identified lyrics have been changed by one or more users from one or more user computing devices 12, server 14 may be programmed to analyze the entered lyrics and alert the user through indication sent for display on the user computing device 12 of lyrics that match the rhythm, syllables, rhyming pattern and so forth, as shown in FIG. 12E. The indication may be alerting the user of new lyrics entered that are determined a good fit, such as a visual indication with green color, or a visual indication with a red color that the entered lyrics are a poor fit with red color. The indication of entered lyrics that are poor fit may include an explanation as to what is wrong with the lyrics, such as not enough syllables, doesn't match the rhythm, doesn't rhyme and so forth. The server 14 may also be programmed to recommend how to fix the lyric determined to be wrong.

Figure 12F:
FIG. 12F depicts a user computing device with a user interface accessing a song writer system for creating song lyrics according to an embodiment.

Once the new lyrics are finalized, the server 14 is programmed to send for display on the user computing device the new lyrics and may include the music with the lyrics as sheet music as shown in FIG. 12F, wherein in some embodiments, the new lyrics are highlighted or otherwise designated visually as the new lyrics. The music may be adjusted for key as selected by the user and so forth. The user may then print and/or save the sheet music.

Figure 13:
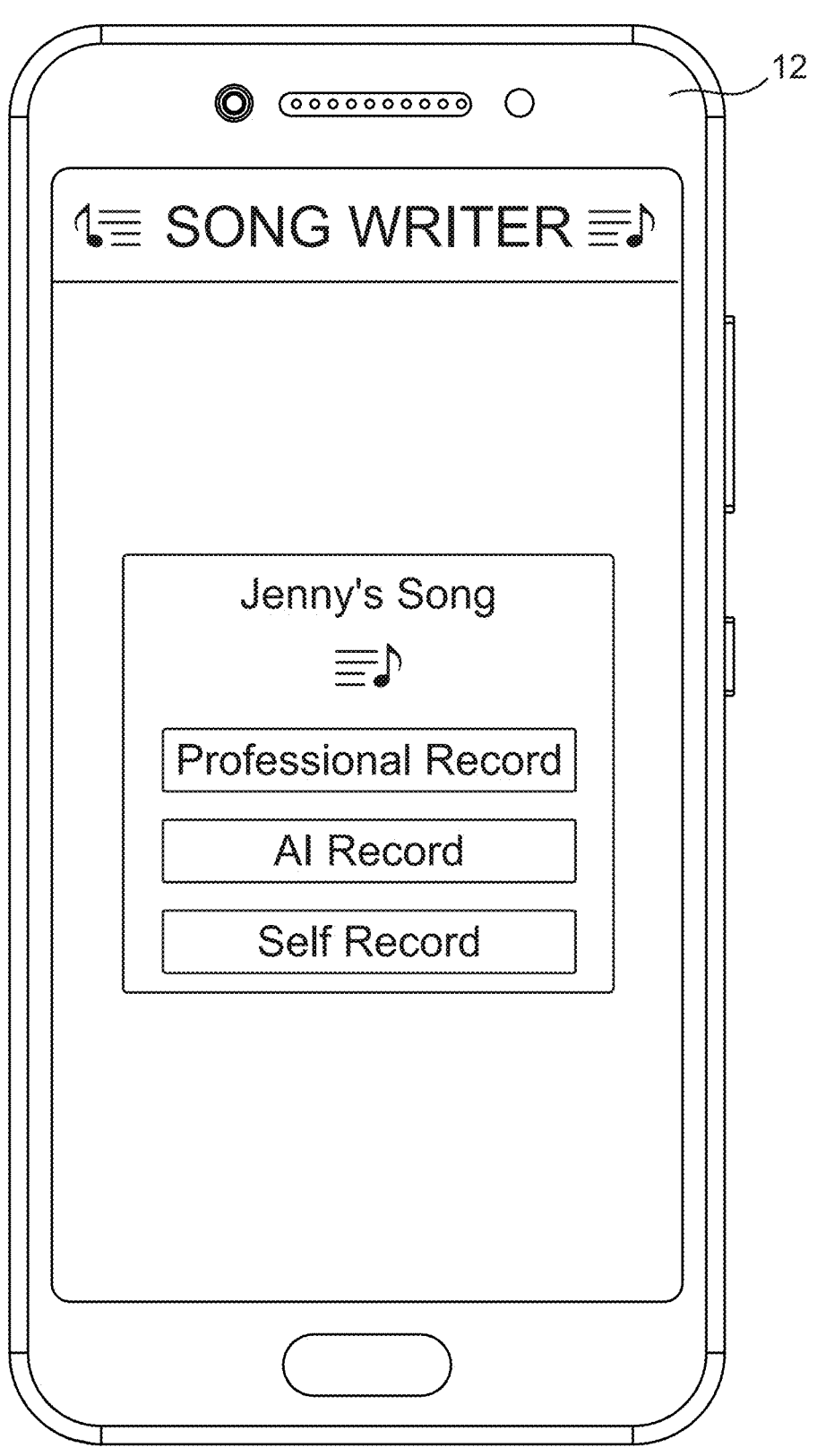
FIG. 13 depicts a user computing device with a user interface accessing a song writer system for creating a recording of the created song lyrics according to an embodiment.
Figure 14:
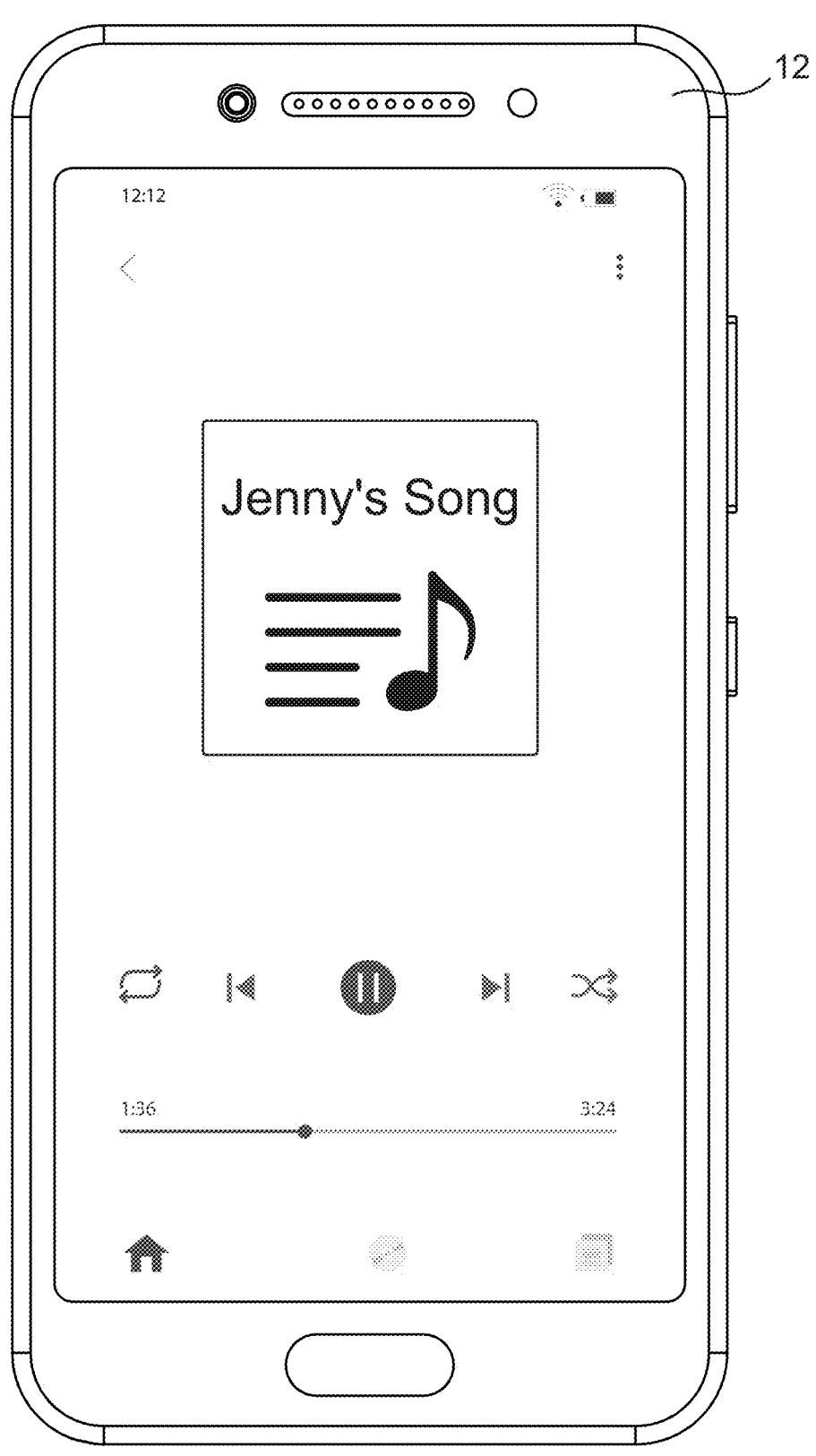
FIG. 14 depicts a user computing device with a user interface accessing a song writer system for playing the song created by the user according to an embodiment.
Figure 15:
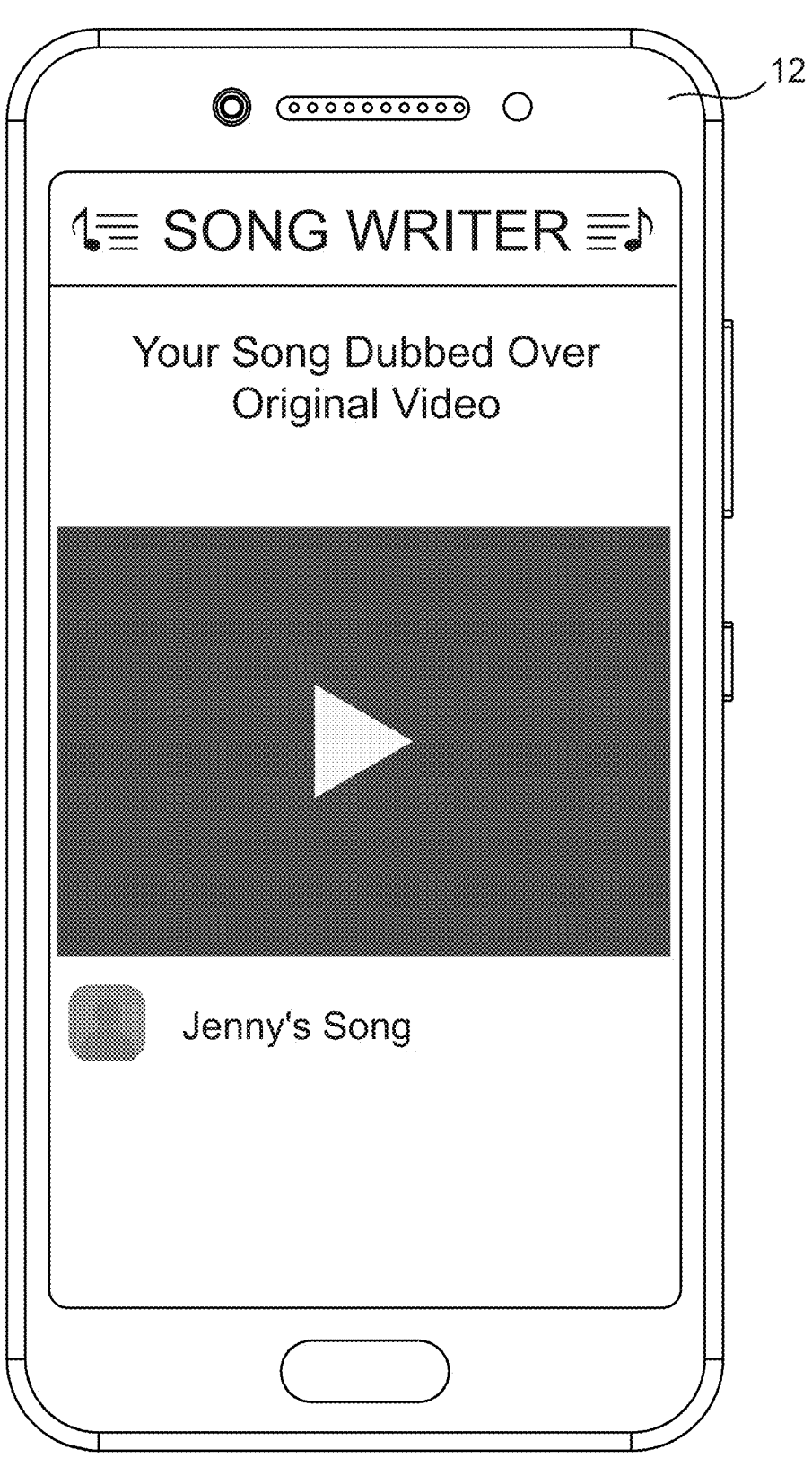
FIG. 15 depicts a user computing device with a user interface accessing a song writer system for dubbing the song created by the user over a video according to an embodiment.
Figure 20:
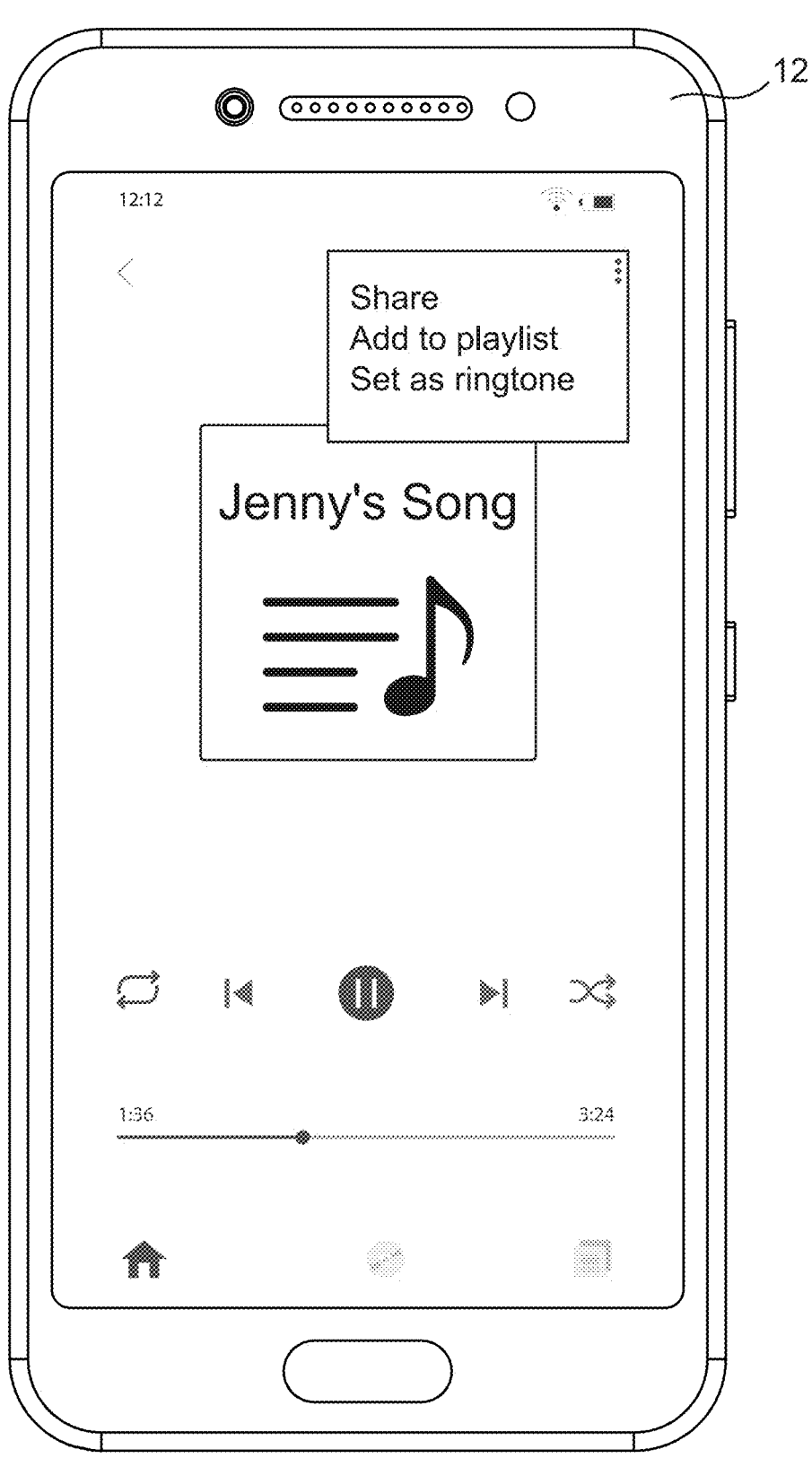
FIG. 20 depicts a user computing device with a user interface accessing a song writer system for sharing the created song through mediums like social media, adding to a playlist, adding as a ringtone and so forth according to an embodiment.

Once the new song with replaced lyrics is finalized, the system 10 may include the server programmed to send for display on the user computing device 12 a user interface that allows a user to select if he or she wishes to record the newly created song. (See FIG. 13) This can be done with a professional record, such as by the original artist, a professional singer or other celebrity, an artificial intelligence recording, or a self-recording. The system 10 may be programmed to playback the recorded new song, as depicted in FIG. 14. Further, referring to FIG. 15, the system 10 may include the server programmed to have the song dubbed over video, such as the original video of the song that was modified, and the video may be played back through the system. Additionally, the video may include the user lip syncing to a recording of the song on a video, artificial intelligence software may record the lyrics and mimic the original voice or replace the original lyrics with the replacement lyrics, or the user may record his or her voice over the original lyrics with the entered replacement lyrics and dub his or her voice over the original artist's voice. The song may be shared, added to a playlist, set as a ringtone or the like, as depicted in FIG. 20.

Figure 16A:
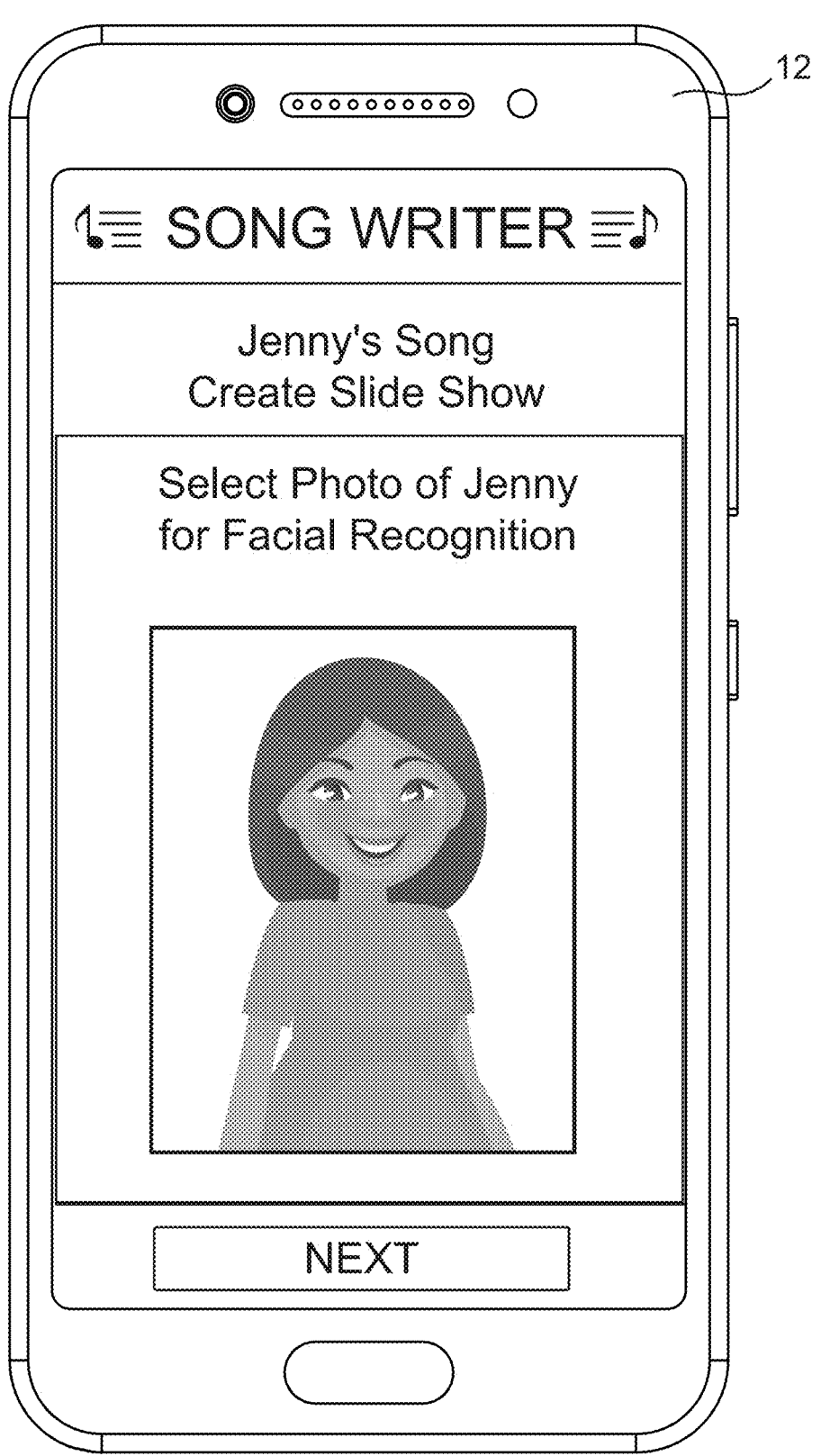
FIG. 16A depicts a user computing device with a user interface accessing a song writer system for creating a slide show from photos to match to the created song according to an embodiment.
Figure 16B:
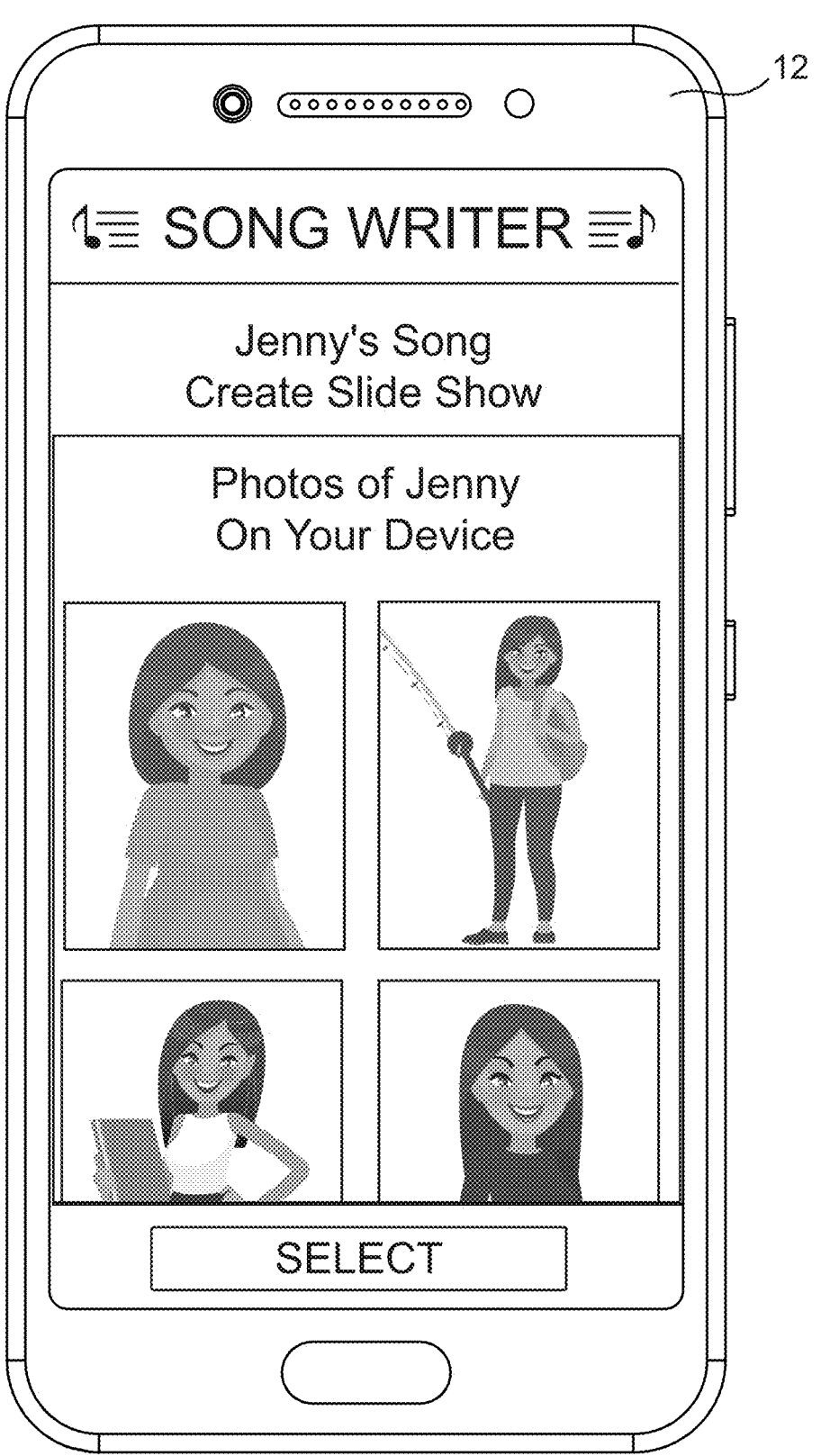
FIG. 16B depicts a user computing device with a user interface accessing a song writer system for creating a slide show from photos to match to the created song according to an embodiment.

The song writer system 10 may operate to auto generate a slide show to match with the song. For example, as shown in FIGS. 16A-16B, the user may select a photo stored on the user computing device 12 and allow the user computing device 12 to perform facial recognition of the selected photo. The user computing device 12 may then be programmed to search through photos stored on the user computing device 12 and identify all photos matching the facial recognition. Further, the system 10 may also operate to locate photos that are not only matching facial recognition but also matching the new lyrics entered in by the user. An example, but not a limitation, is depicted in FIG. 16B wherein the new lyrics entered include a reference to fishing, and the system operated to find a photo that matched the facial recognition and the lyrics related to fishing showing an image of the individual with a fishing pole. This may be performed by the server 14 as well. The photos may then be automatically uploaded, and time matched to the newly created song and a slide show timed to the recording of the newly created song may be automatically generated by the system 10, such as by the user computing device 12, the server 14 or the user computing device 12 and server 14 operating in conjunction with each other.

Figure 17A:
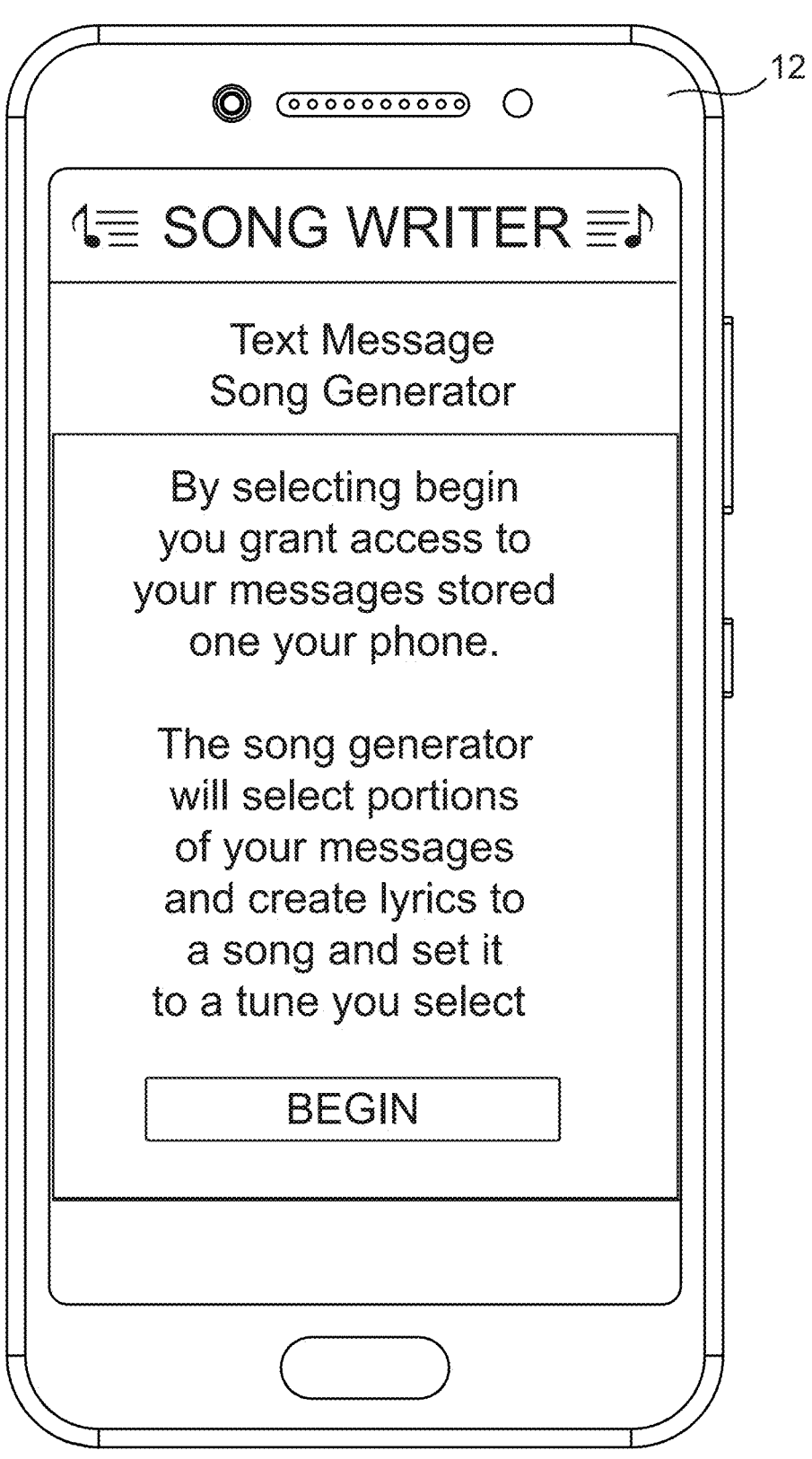
FIG. 17A depicts a user computing device with a user interface accessing a song writer system for creating song lyrics from text messages according to an embodiment.
Figure 17B:
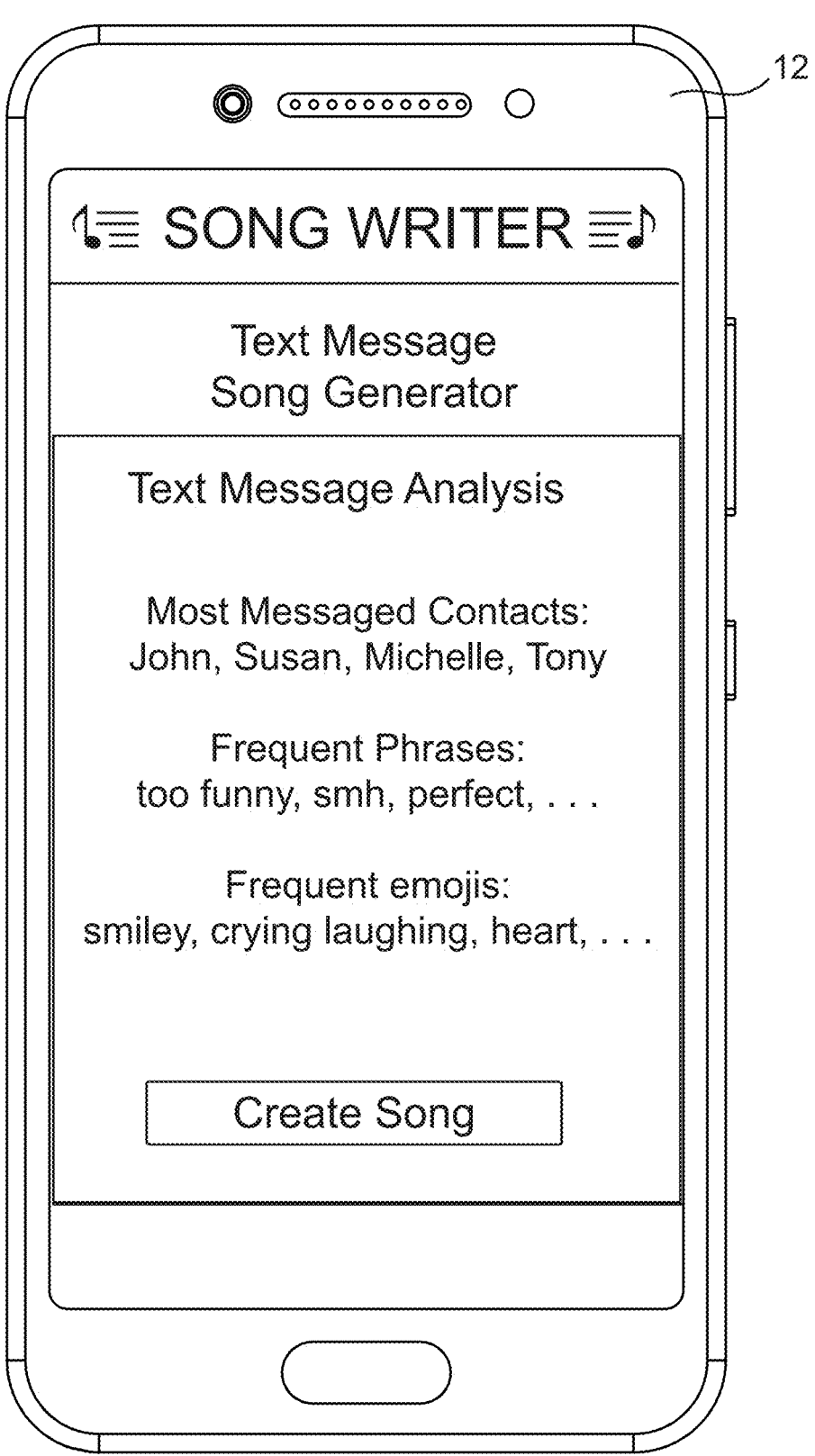
FIG. 17B depicts a user computing device with a user interface accessing a song writer system for creating song lyrics from text messages according to an embodiment.
Figure 18A:
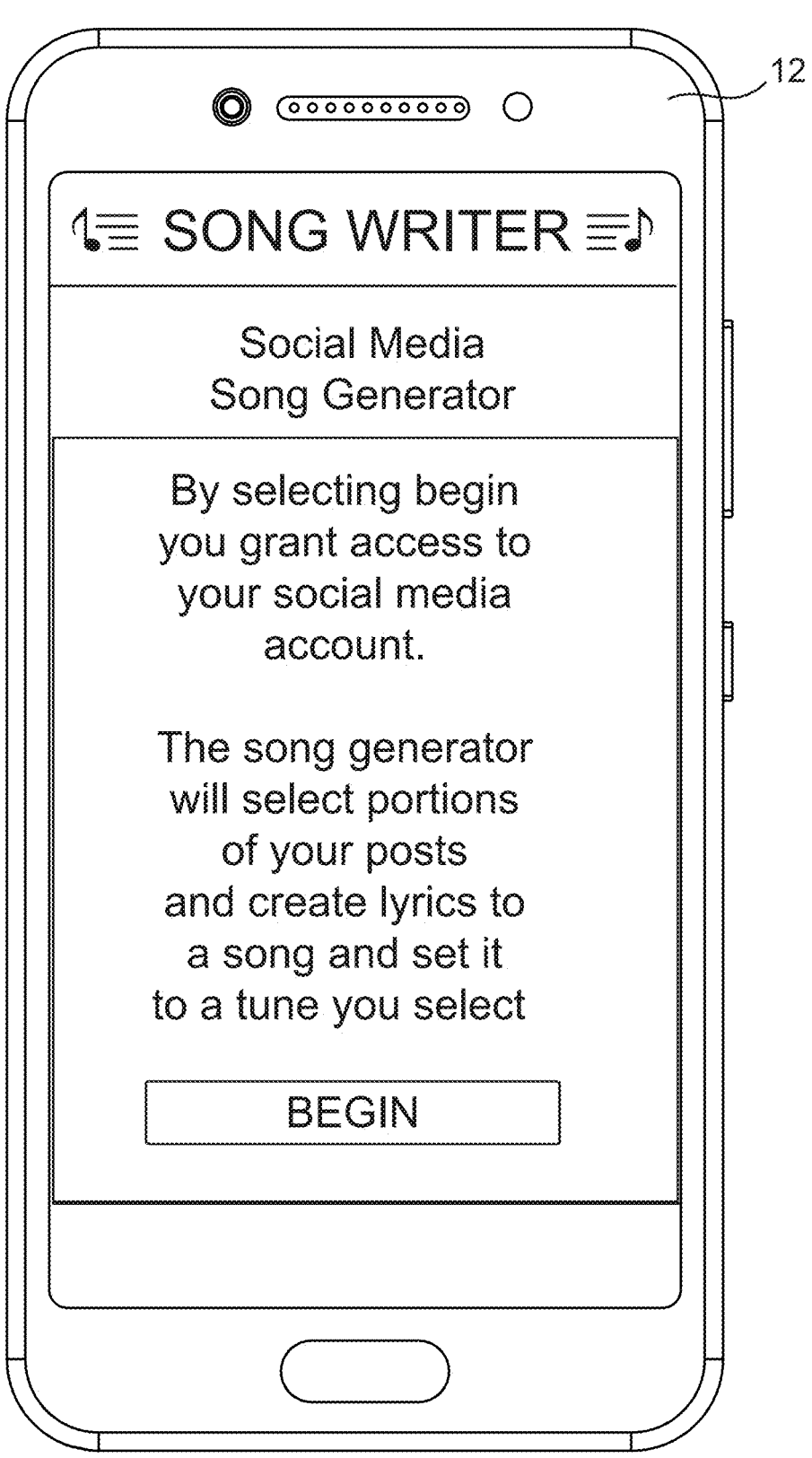
FIG. 18A depicts a user computing device with a user interface accessing a song writer system for creating song lyrics from social media posts according to an embodiment.
Figure 18B:
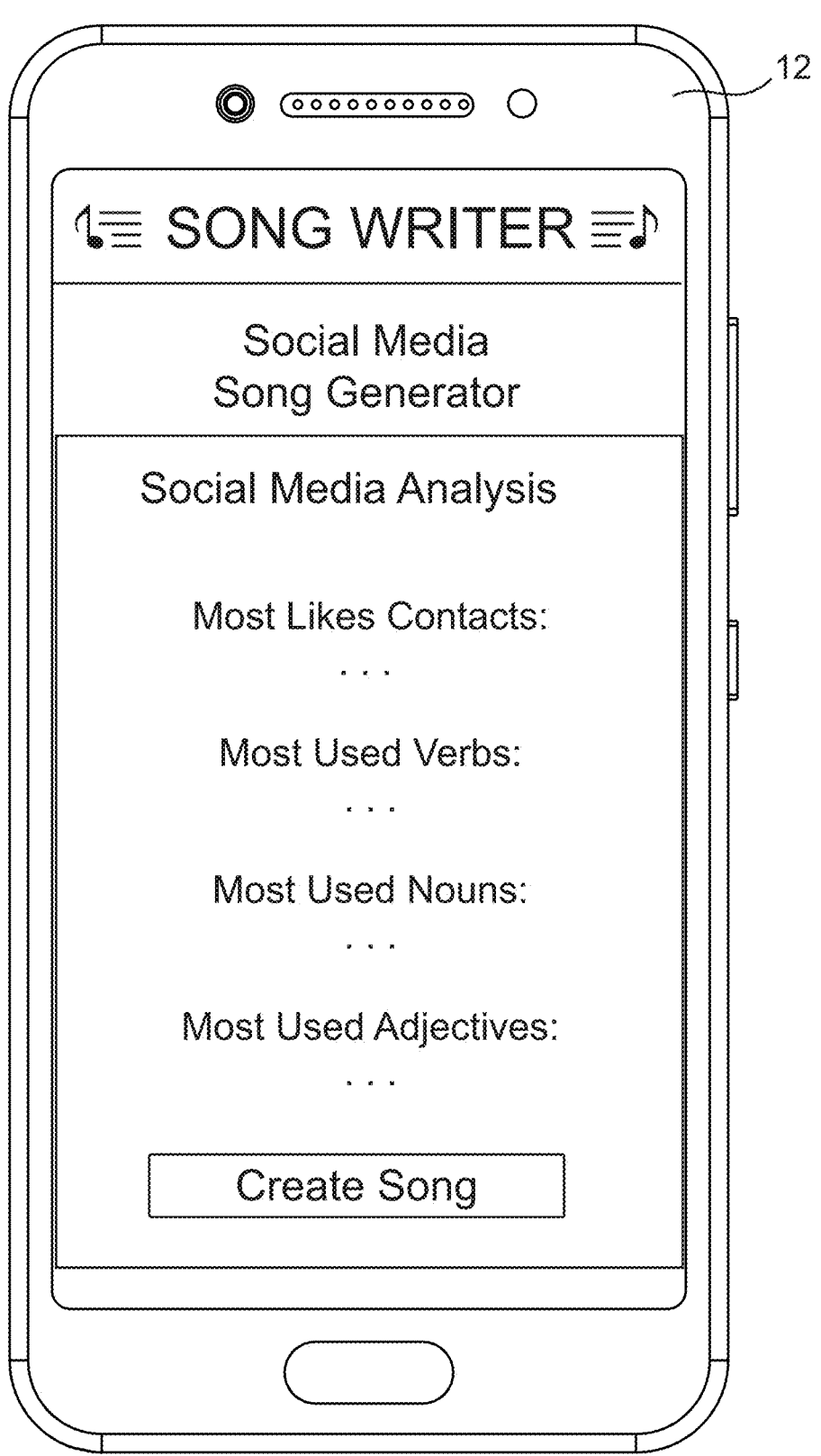
FIG. 18B depicts a user computing device with a user interface accessing a song writer system for creating song lyrics from social media posts according to an embodiment.
Figure 19:
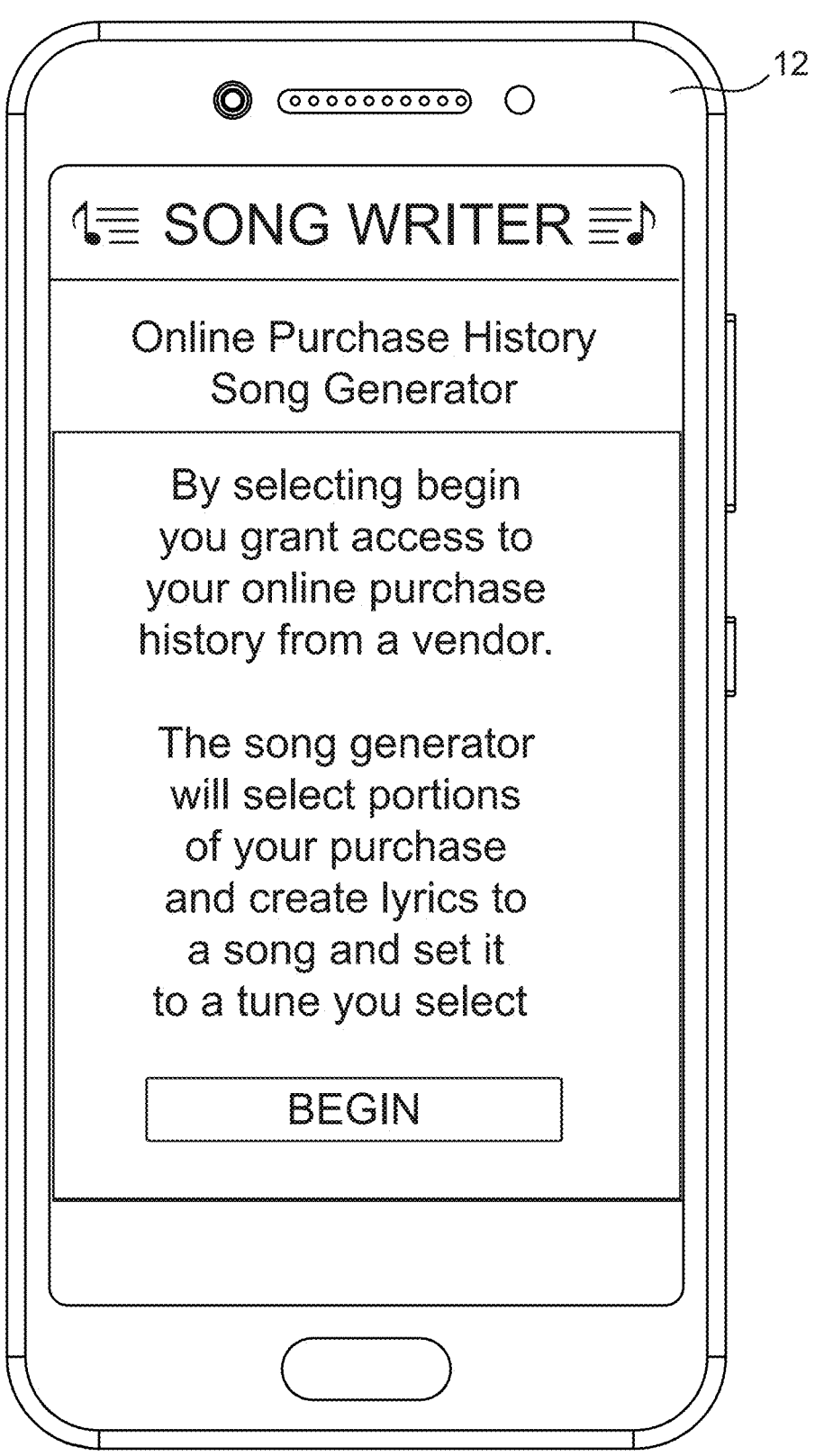
FIG. 19 depicts a user computing device with a user interface accessing a song writer system for creating song lyrics from online purchase history according to an embodiment.

Another embodiment may include the system 10 depicted in FIGS. 17A-17B, wherein the server 14 and the user computing device 12 operate to generate a song from text messages, the server 14 and/or user computing device 12 may be programmed to search through text messages stored on the user computing device 12 and create a song based on the text messages. The system 10 may identify certain elements of the text in the messages stored on the user computing device 12 through a text message analysis to identify certain elements within the text messages, such as, but not limited to, most messages contacts, frequent phrases and frequent emojis. The system 10 may then create a song utilizing the text message analysis. The system 10, as shown in FIG. 18A-18B, may operate similarly to that depicted in FIGS. 17A-17B but with respect to social media in order to create a song. In each of these instances, the server and/or user computing device may be programmed to analyze the text messages or social media posts in order to create a new song. The analysis of the texts and social media may include most used verbs, nouns adjectives and the like. In additional embodiments, the system 10 may include granting access to online purchase history to generate a song, such as shown in FIG. 19, wherein to system can generate a song based on the past products purchased by the user through an online shopping system. The songs generated from text messages, social media and/or online purchase history may include totally unique lyrics set to an existing song or may include replacing portions of lyrics from an existing song with elements from the text messages, social media posts and/or online purchase history. In additionally embodiments, the system 10 depicted in FIGS. 17A-19 may operate to not only write a song, but to write a profile of the user using text messages, social media posts and/or online purchase history and the created profile may be lyrics of a song.

It will be understood that the system 10 may include an ability to establish a master lease for the utilization of preexisting music and lyrics. This allows the system 10 to provide various types of songs for recreation of lyrics and to do so without violation of copyrights or other rights in the music. The system 10 may also be programmed to allow for one button copyright application of a newly created song by the user if it is unique lyrics set to music rather than lyrics replacing portions of existing lyrics.

Embodiments may be available on or through the internet, such as through domain names reserved and owned by Applicant that include tune-machine.com, tunecustom.com, vocalsai.com, lyricsmachine.com, syn-ant.com, thesaurustune.com, thesaurusmysong.com, lyricalgame.com, lyricgame.com, lyricsmadness.com, lyric-macchine.com, ciyrl-.com, jingle-game.com, jinglebuilder.com, jingle-machine.com, jingle-star.com, songdubb.com and the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A song writer system comprising:
a server having a memory storing user information and song information including lyrics for a plurality of songs; and
a plurality of user computing devices coupled to the server, wherein the server is programmed to:
receive a signal that the user computing devices have accessed the system to engage in a lyrical game and initiate a game;
select a song from one of the plurality of songs stored in the memory of the server and identify portions of lyrics from the selected song to be replaced;
send for display on the user computing devices the lyrics of the selected song with a visual indication highlighting specific words or phrases within the lyrics that are pre-identified by the server as lyrics to be replaced and a user input box for entering replacement lyrics for the identified lyrics, wherein the selection of the identified lyrics to replace then allows entry of replacement lyrics for the selected identified lyrics;
receive replacement lyrics entered and store the replacement lyrics within the server corresponding to the selected identified lyrics and corresponding to each user computing device of the plurality of user computing devices;
utilize artificial intelligence to analyze the entered replacement lyrics to determine if the replacement lyrics match rhythm, syllables, or rhyming pattern of the original lyrics; and determine a winner in response to analyzing the entered replacement lyrics from the plurality of user computing devices based on a scoring rubric.

2. The system of claim 1, wherein the scoring rubric includes votes for replacement lyrics by the plurality of user computing devices.

3. The system of claim 1, wherein the artificial intelligence comprises a machine learning model trained on lyrical patterns.

4. The system of claim 1, wherein the server provides feedback to the user indicating a degree of match between the replacement lyrics and the original lyrics.

5. A song writer system comprising:

a server having a memory storing user information and song information including lyrics for a plurality of songs; and a plurality of user computing devices coupled to the server, wherein the server is programmed to:

receive a signal that the user computing devices have accessed the system to engage in creation of a song;

select a song from one of the plurality of songs stored in the memory of the server and identify portions of lyrics from the selected song to be replaced;

send for display on the user computing devices the lyrics of the selected song with a visual indication highlighting specific words or phrases within the lyrics that are pre-identified by the server as lyrics to be replaced and a user input box for entering replacement lyrics for the identified lyrics, wherein the selection of the identified lyrics to replace then allows entry of replacement lyrics for the selected identified lyrics;

receive replacement lyrics entered and store the replacement lyrics within the server corresponding to the selected identified lyrics and corresponding to each user computing device of the plurality of user computing devices;

utilize artificial intelligence to analyze the entered replacement lyrics to determine if the replacement lyrics match rhythm, syllables, or rhyming pattern of the original lyrics, and send analysis of the replacement lyrics to the user computing device to alert the user to the replacement lyrics that are a good fit and the replacement lyrics that are a poor fit.

6. The system of claim 5, wherein the song selected is determined by analyzing criteria entered through the user computing device and stored in the memory of the server.

7. The system of claim 6, wherein the server is further programmed to analyze the lyrics and identify portions of the lyrics to replace based on the entered criteria.

8. The system of claim 5, wherein the artificial intelligence comprises a machine learning model trained on lyrical patterns.

9. The system of claim 5, wherein the server provides feedback to the user indicating a degree of match between the replacement lyrics and the original lyrics.

\* \* \* \* \*